US012620693B2

(12) United States Patent
Tanabe et al.

(10) Patent No.: US 12,620,693 B2
(45) Date of Patent: May 5, 2026

(54) STEREOSTRUCTURE SPACECRAFT

(71) Applicant: Hitachi, Ltd., Tokyo (JP)

(72) Inventors: Yosuke Tanabe, Tokyo (JP); Tsukasa Funane, Tokyo (JP); Koichi Watanabe, Tokyo (JP); Hisatoshi Kimura, Tokyo (JP); Makoto Ito, Tokyo (JP)

(73) Assignee: HITACHI, LTD., Tokyo (JP)

( * ) Notice: Subject to any disclaimer, the term of this patent is extended or adjusted under 35 U.S.C. 154(b) by 261 days.

(21) Appl. No.: 18/594,564

(22) Filed: Mar. 4, 2024

(65) Prior Publication Data

US 2025/0002177 A1    Jan. 2, 2025

(30) Foreign Application Priority Data

Jun. 28, 2023    (JP) ................................. 2023-105999

(51) Int. Cl.
| | |
|---|---|
| *H01Q 1/28* | (2006.01) |
| *B64G 1/66* | (2006.01) |
| *H01Q 1/08* | (2006.01) |
| *B64G 1/22* | (2006.01) |

(52) U.S. Cl.
CPC .............. *H01Q 1/288* (2013.01); *B64G 1/66* (2013.01); *H01Q 1/08* (2013.01); *B64G 1/2225* (2023.08)

(58) Field of Classification Search
CPC ............. H01Q 1/288; H01Q 1/08; B64G 1/66
USPC ........................................................ 342/352
See application file for complete search history.

(56) References Cited

U.S. PATENT DOCUMENTS

| | | | | |
|---|---|---|---|---|
| 10,131,452 | B1 * | 11/2018 | Rohweller | ........... H01Q 1/1235 |
| 2014/0042275 | A1 * | 2/2014 | Abrams | ................. B64G 1/407 |
| | | | | 244/172.6 |
| 2024/0343417 | A1 * | 10/2024 | Allison | .................... B64G 1/44 |

FOREIGN PATENT DOCUMENTS

JP            2008-236500 A      10/2008

* cited by examiner

*Primary Examiner* — Harry K Liu
(74) *Attorney, Agent, or Firm* — MATTINGLY & MALUR, PC

(57) ABSTRACT

A stereostructure spacecraft of the present invention comprises multiple deployable beam members, multiple tension members, and a spacecraft for storing the deployable beam members and the tension members. The stereostructure spacecraft is formed by deploying the deployable beam members and the tension members around the spacecraft. The deployable beam members stored in the spacecraft are deployed and arranged equidistantly in directions of multiple rotational symmetry axes, the rotational symmetry axes being rotational symmetry axes of a virtual polyhedron that is formed to have a substantial center of the spacecraft as an origin. The tension members support two end portions of two adjacent deployable beam members with tension. The respective end portions of the deployable beam members are simultaneously supported by three or more of the tension members.

8 Claims, 21 Drawing Sheets

FIG. 11C
NULL RECEIVING DIRECTION
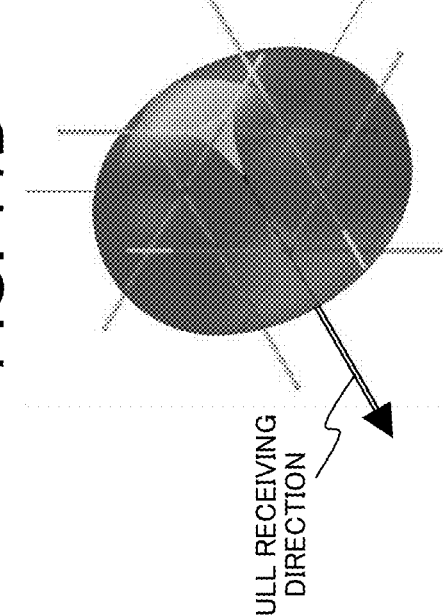
FIG. 11D
NULL RECEIVING DIRECTION
FIG. 11A
DEPLOYABLE BEAM MEMBER AS DIPOLE ANTENNA
DIRECTIONAL PATTERN OF DIPOLE ANTENNA ARRAY
$C_3$ ROTATIONAL SYMMETRY AXIS
INTER-ANTENNA DISTANCE
$C_3$ ROTATIONAL SYMMETRY AXIS
NULL RECEIVING DIRECTION
$C_3$ ROTATIONAL SYMMETRY AXIS
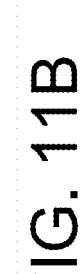
FIG. 11B
NULL RECEIVING DIRECTION
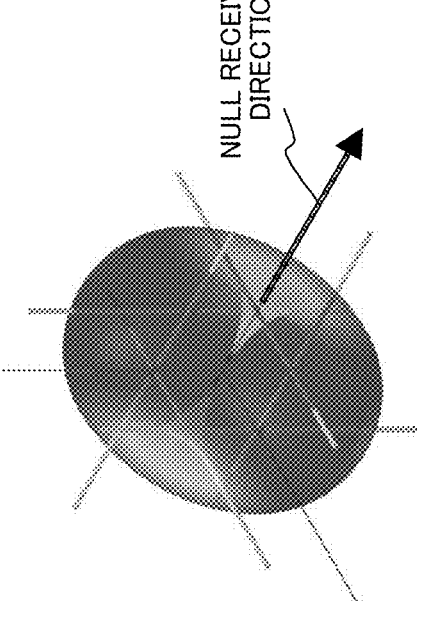

FIG. 12C

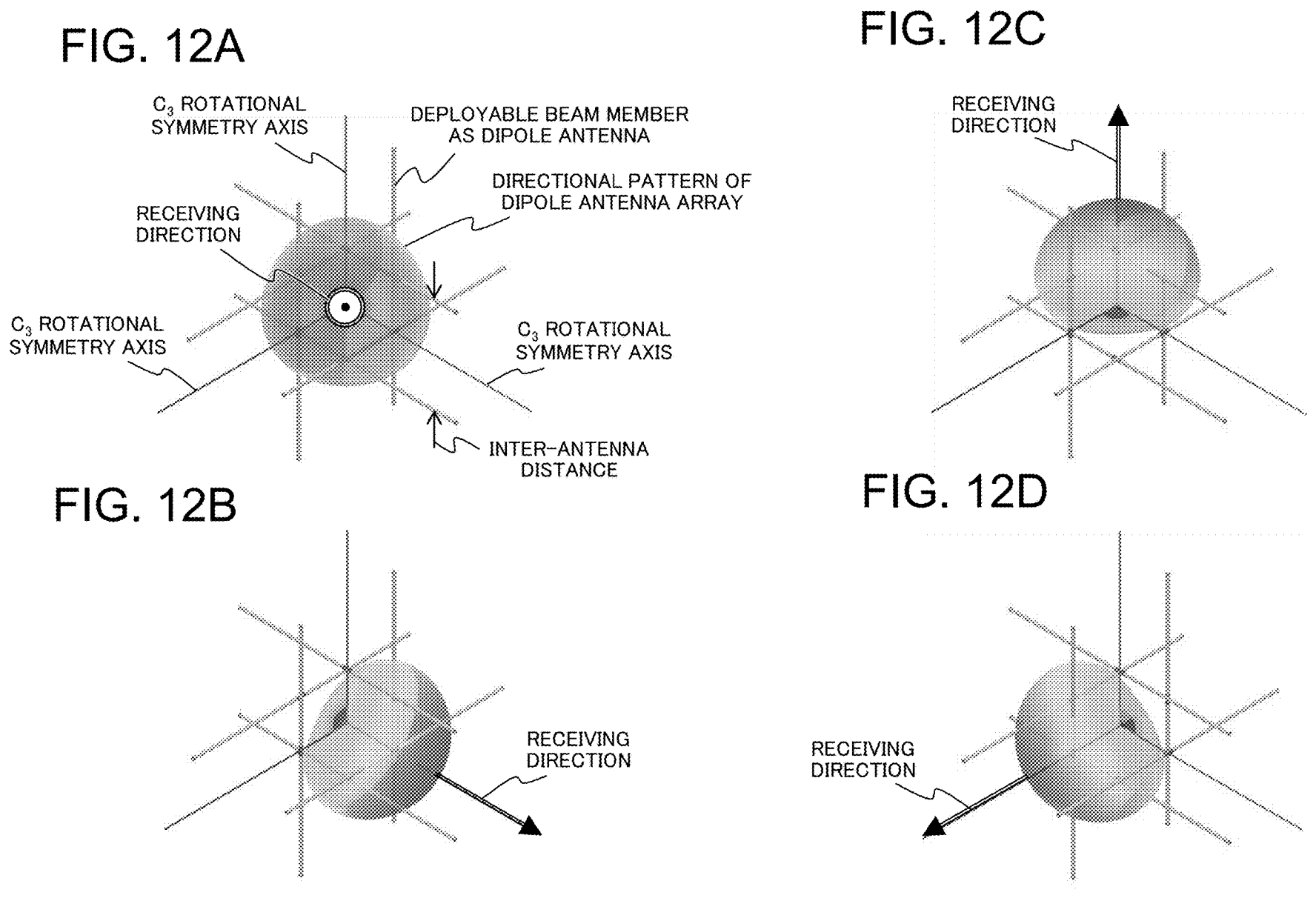

RECEIVING DIRECTION

FIG. 12D

RECEIVING DIRECTION

FIG. 12A

DEPLOYABLE BEAM MEMBER AS DIPOLE ANTENNA

DIRECTIONAL PATTERN OF DIPOLE ANTENNA ARRAY $C_3$ ROTATIONAL SYMMETRY AXIS

INTER-ANTENNA DISTANCE $C_3$ ROTATIONAL SYMMETRY AXIS

RECEIVING DIRECTION $C_3$ ROTATIONAL SYMMETRY AXIS

FIG. 12B

RECEIVING DIRECTION

INTER-ELEMENT
DISTANCE

SPACECRAFT
3

1 FIRST DEPLOYABLE
BEAM MEMBER

12 DIPOLE
ANTENNA

2
TENSION
MEMBER

SECTIONAL VIEW A-A

A

FIRST DEPLOYABLE
BEAM MEMBER
1

THIN FILM

TENSION
MEMBER
2

SPACECRAFT
3

STEREOSTRUCTURE SPACECRAFT

CROSS-REFERENCE TO RELATED APPLICATION

The present application claims priority from Japanese Patent Application JP 2023-105999 filed on Jun. 28, 2023, the content of which is hereby incorporated by reference into this application.

BACKGROUND OF THE INVENTION

The present invention relates to a stereostructure spacecraft.

An electromagnetic wave radiated by accelerated motions of electrons is absorbed and scattered by various atoms in the propagation process, and newly induces emission of electromagnetic waves. Electromagnetic waves include various kinds of information about not only electronic anthropogenic activities on earth or in outer space but also substances of celestial bodies such as fixed stars, planets, and nebulas as well as actions and formation processes of those substances. Observation of the electromagnetic wave, and analysis of a radiation source and a propagation process of the electromagnetic wave may be of significant help to understand the anthropogenic activities and global environment, and clarify the celestial activities and the celestial formation processes.

Recently, in the case of the visible light and the electromagnetic wave with a nearby wavelength of the visible light, the progress of constellation in the low orbit earth observation satellites has made high frequency/resolution observation data available. In order to grasp the state of the radiation source and the propagation path in the distance, or those which cannot be grasped by the visible light, the artificial satellite mounted with an antenna has been used for observing electromagnetic waves (hereinafter referred to as radio waves) with wavelength longer than that of infrared.

When executing a radio wave observation in outer space, it is necessary to identify radio radiation sources in various directions at various distances at a high resolution so that necessary information is only analyzed. Development of technologies for enlarging aperture of the space antenna has been in progress on a world scale to attain high resolution by making the aperture area of the antenna deployable in outer space sufficiently large relative to the wavelength. As the technology for enlarging the aperture of the space antenna, application of the thin film deployment structure is advantageous to attain the space antenna which reduces the space transportation cost by making the payload compact and light in weight, and ensures high form accuracy.

Document JP 2008-236500 discloses the spacecraft mounted with an antenna. The patent literature aims at provision of the deployable antenna reflector for the spacecraft, which is deployable with high reliability. The deployable antenna includes a metal mesh which constitutes a radio wave reflection surface of the antenna, a network cable constituted by a shape-retaining cable for retaining the shape of the metal mesh, a back cable, and a tie cable which connects the shape-retaining cable and the back cable, multiple deployment masts which are constituted by multiple deployment ribs and deployment hinges for deploying the deployment ribs, and deploy the metal mesh and the network cable from the folded state for holding the metal mesh and the network cable after the deployment, and a tendon cable for connection between the deployment masts. The deployment rib and the network cable are disposed separately while being disconnected from each other, and deployed independently upon deployment of the deployment mast.

Document JP 2008-236500 discloses provision of the deployable antenna reflector for the spacecraft, which is deployable with high reliability. The disclosed deployable antenna, however, still needs to be improved for forming the space antenna with large aperture to ensure both lightness and the form accuracy of the thin film surface.

In order to form the large aperture antenna with high form accuracy through extension of the cantilevered deployment rib from the spacecraft, the cross-sectional area of the deployment rib has to be increased for enhancing bending rigidity of the deployment rib. This may result in weight increase.

In order to improve the omnidirectional space antenna having directivity in all directions, the planar antenna is formed by extending the cantilevered deployment rib from the spacecraft in the planar direction. The resultant structure exhibits high directivity in the direction vertical to the plane, but fails to realize the omnidirectional antenna having directivity in all directions. Accordingly, the radio wave radiation sources existing omnidirectionally in all directions cannot be identified at high resolution.

SUMMARY OF THE INVENTION

It is an object of the present invention to provide a stereostructure spacecraft which allows formation of an omnidirectional space antenna that ensures lightness and the form accuracy of the thin film surface, observes incoming radio waves from the omnidirection, and identifies the radio wave sources existing at various distances in various directions at high resolution.

The present invention provides a stereostructure spacecraft comprising multiple deployable beam members, multiple tension members, and a spacecraft for storing the deployable beam members and the tension members, wherein the stereostructure spacecraft is formed by deploying the deployable beam members and the tension members around the spacecraft, wherein the deployable beam members stored in the spacecraft are deployed and arranged equidistantly in directions of multiple rotational symmetry axes, the rotational symmetry axes being rotational symmetry axes of a virtual polyhedron that is formed to have a substantial center of the spacecraft as an origin, wherein the tension members support two end portions of two adjacent deployable beam members with tension, and wherein the respective end portions of the deployable beam members are simultaneously supported by three or more of the tension members.

Advantageous Effects of Invention

According to the present invention, to provide a stereostructure spacecraft which allows formation of an omnidirectional space antenna that ensures lightness and the form accuracy of the thin film surface, observes incoming radio waves from the omnidirection, and identifies the radio wave sources existing at various distances in various directions at high resolution.

3

Figure 2:
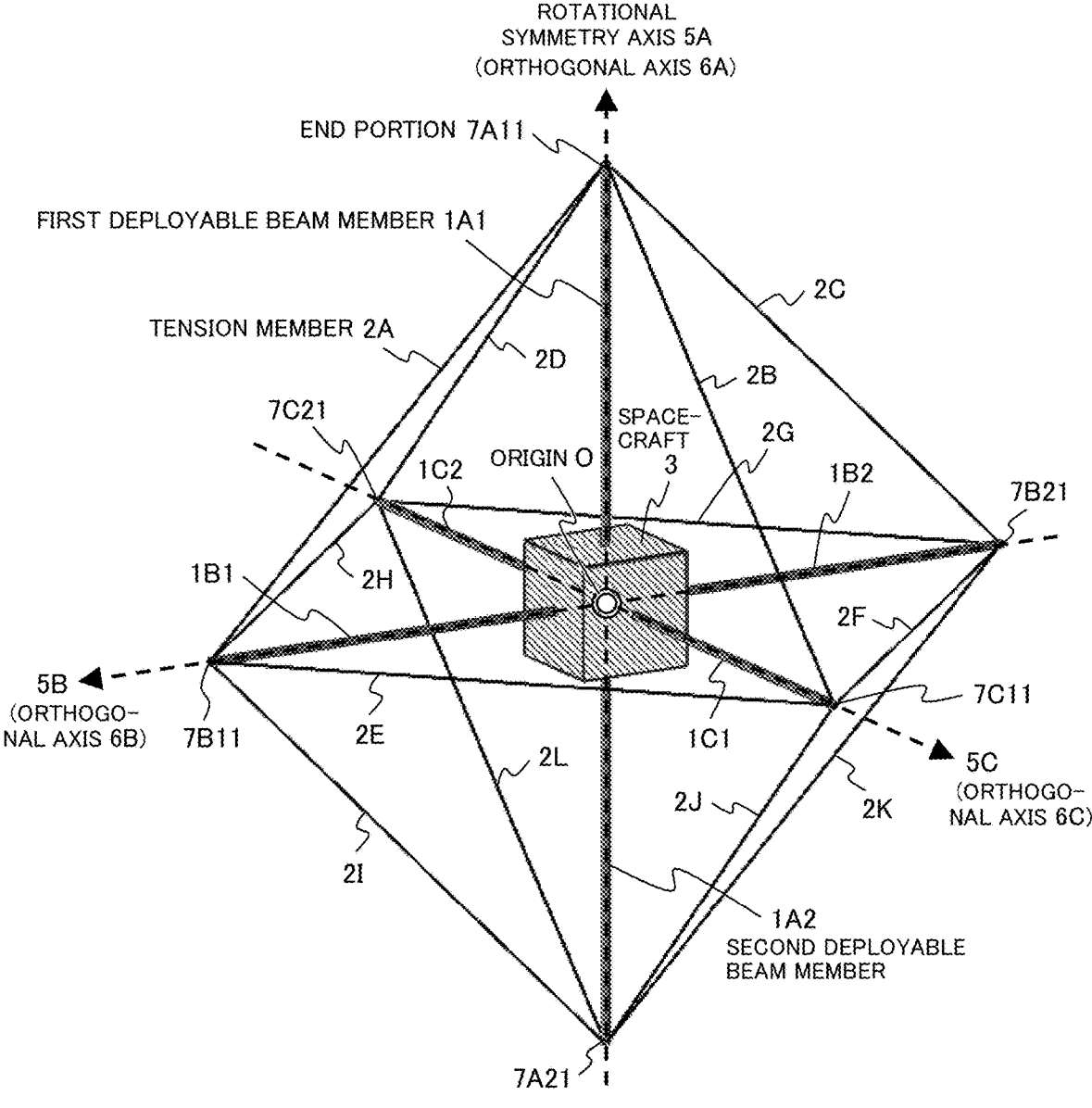
Figure 3:
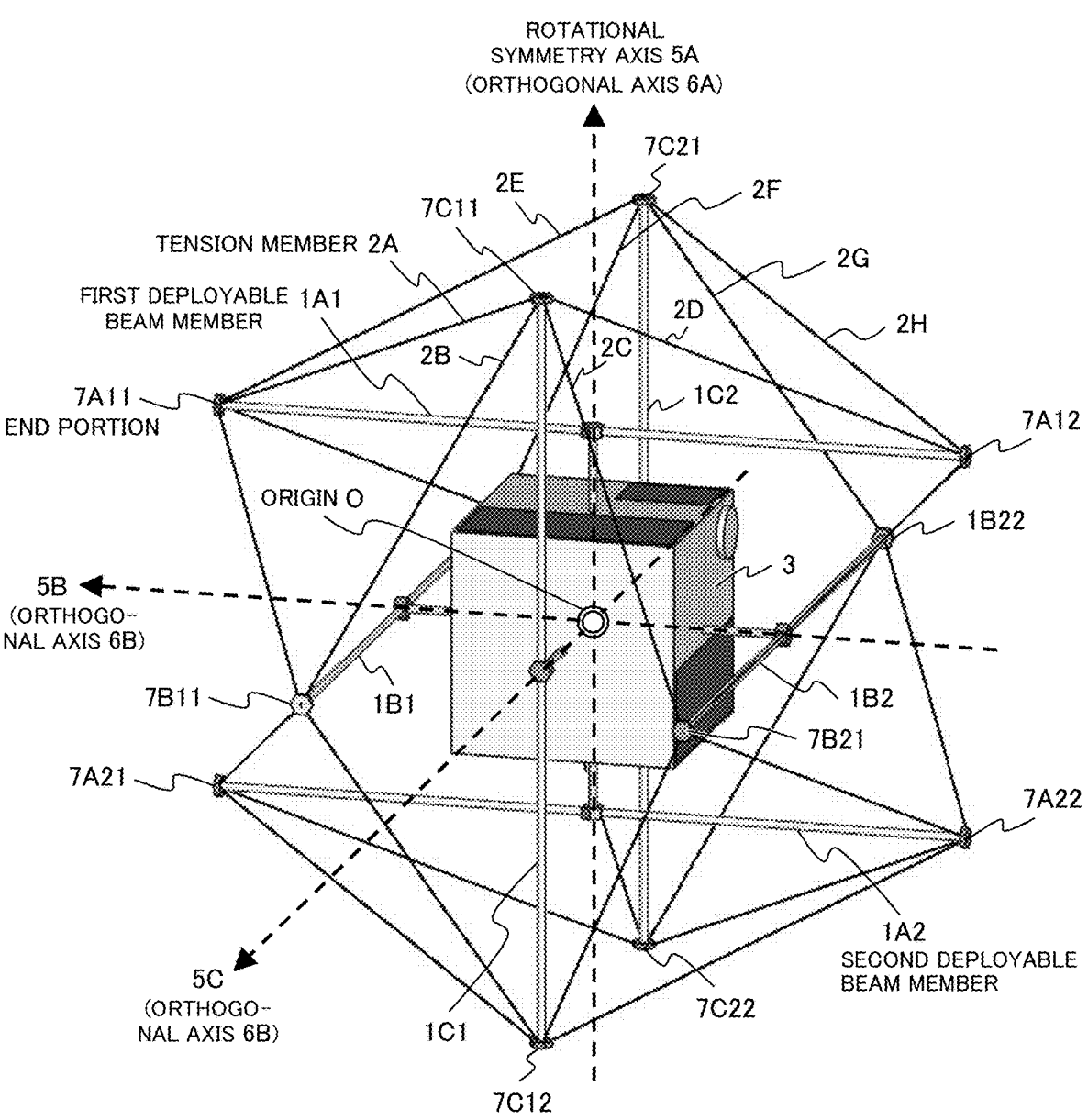
Figure 4:
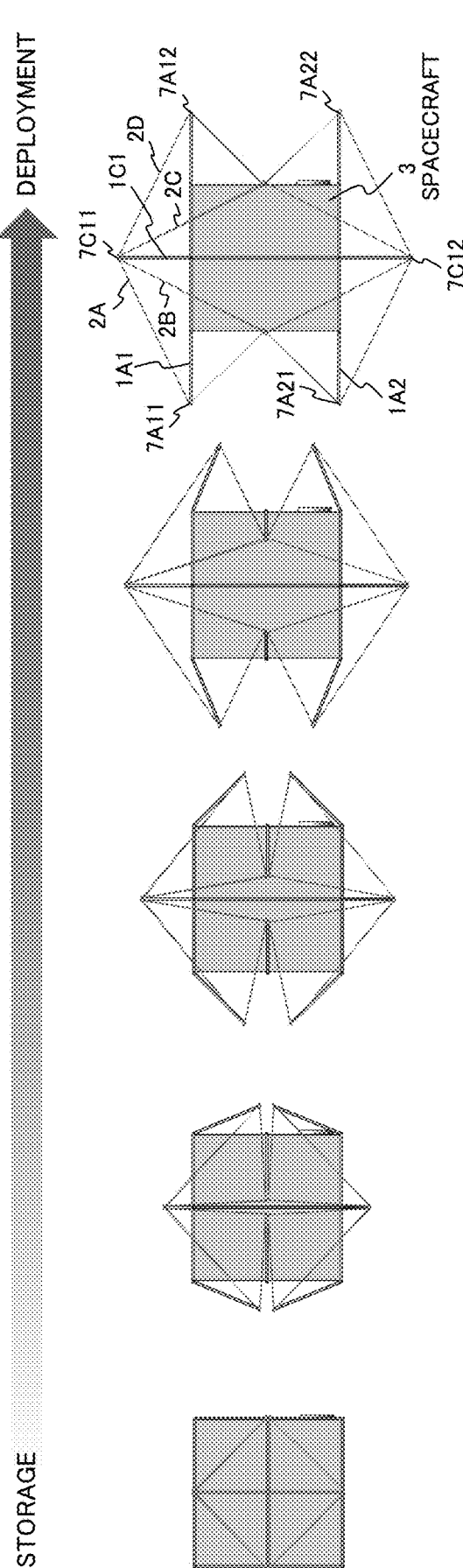
Figure 6:
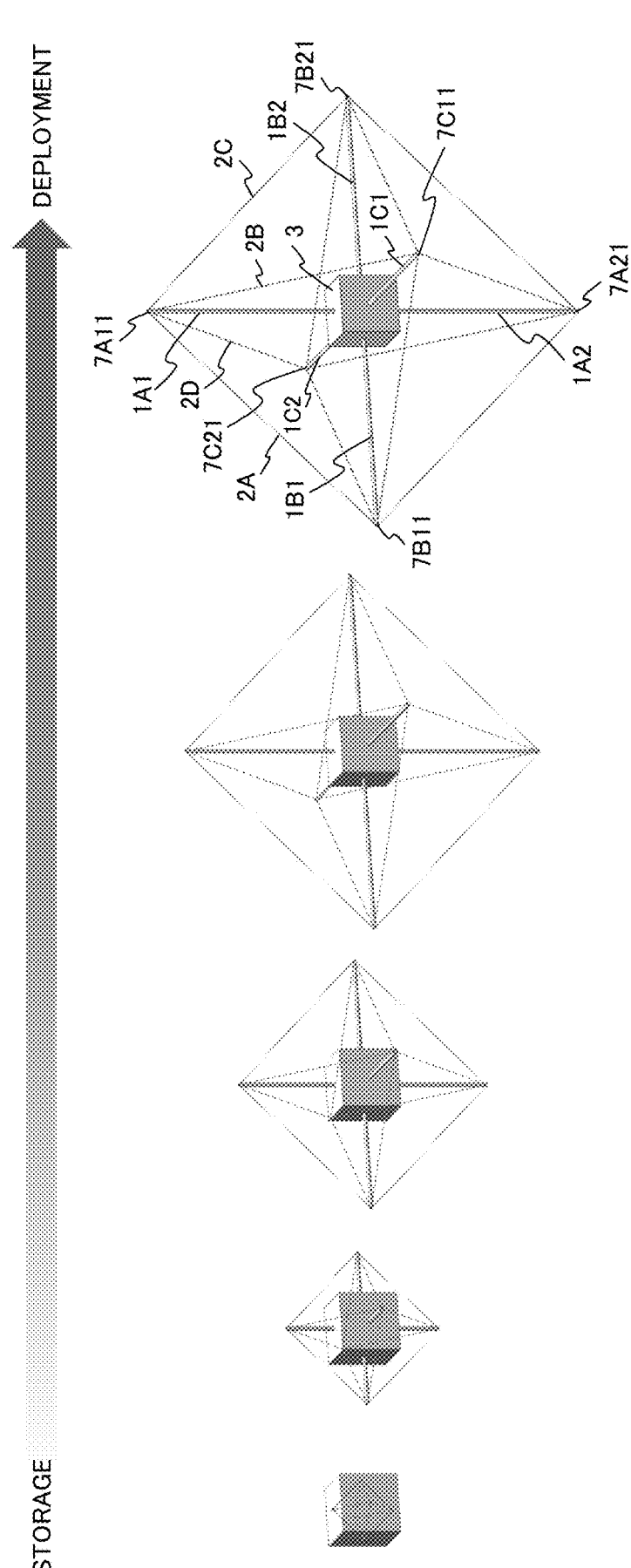
Figure 7:
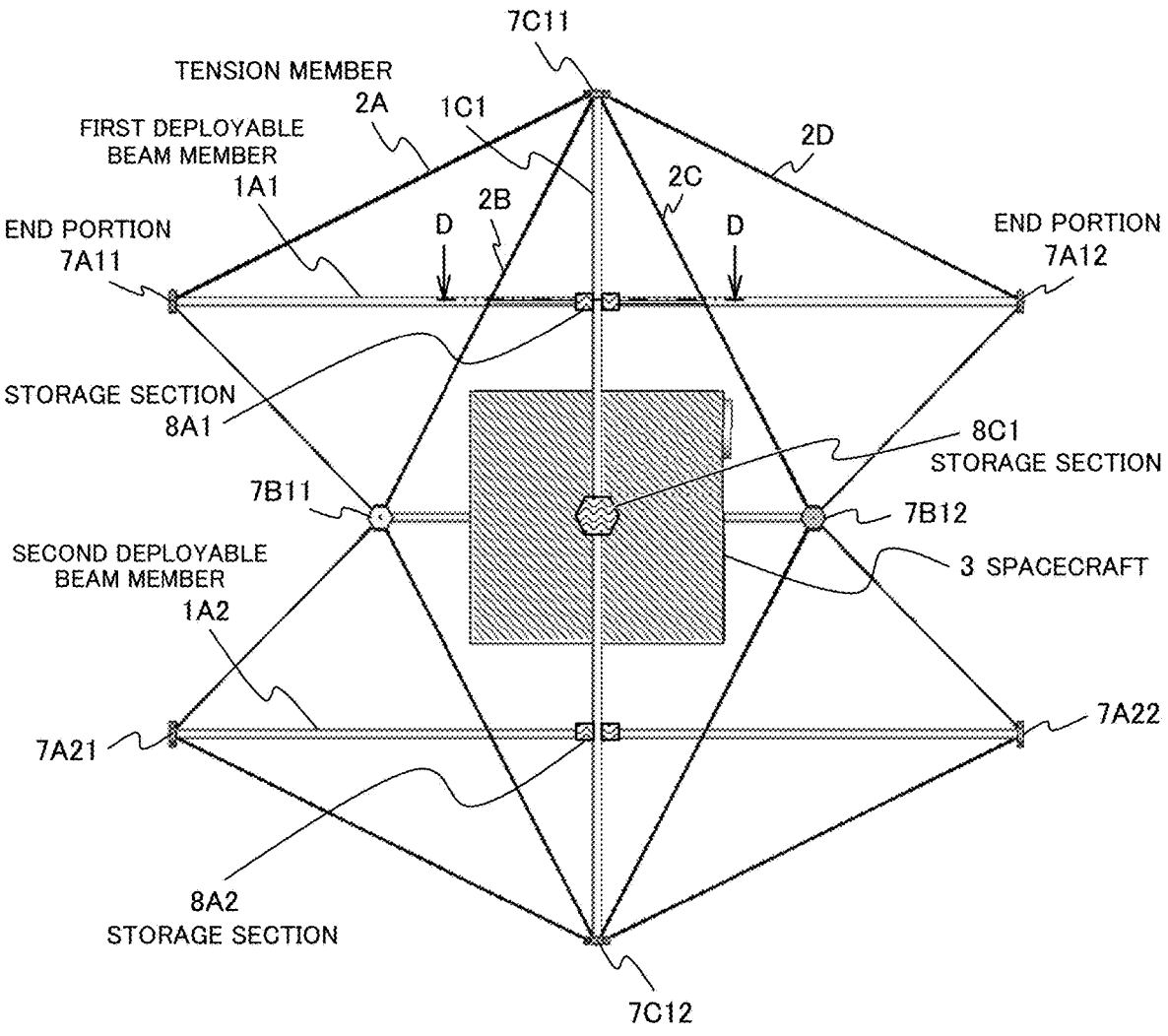
Figure 8:
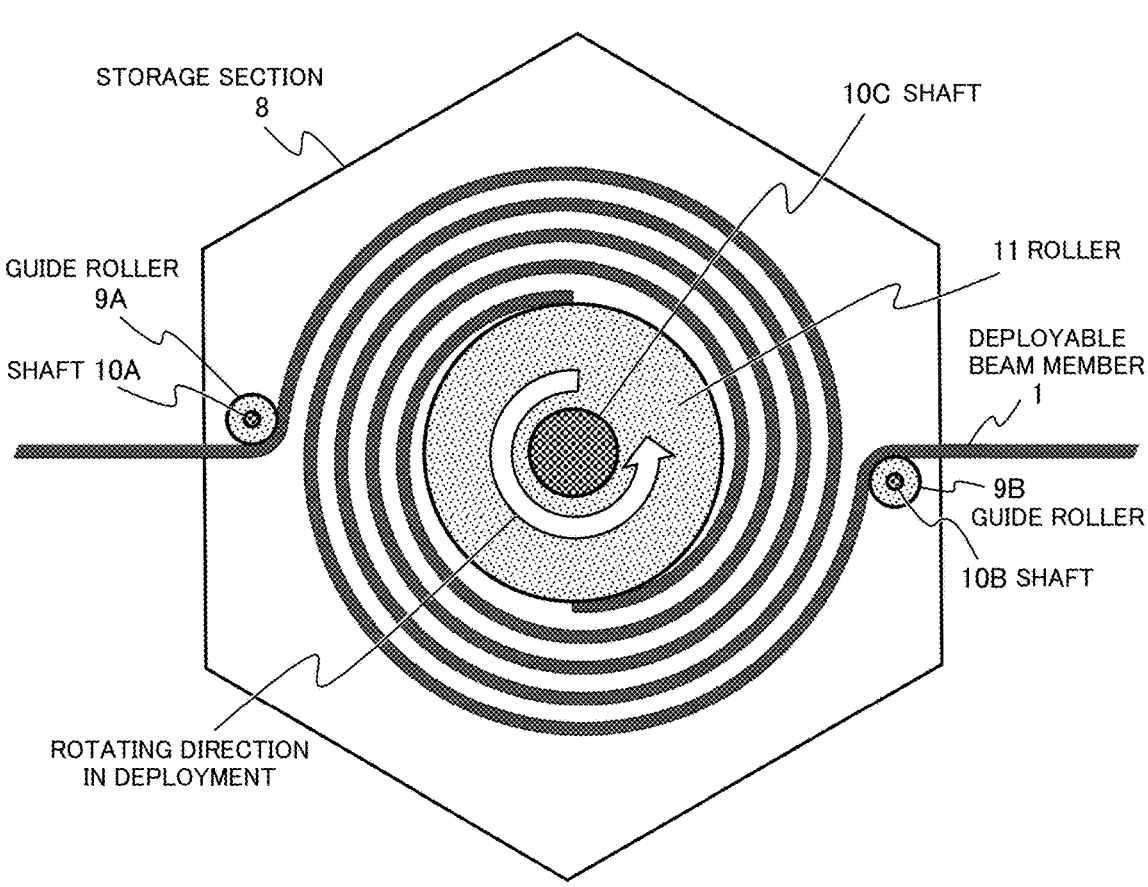
Figure 10:
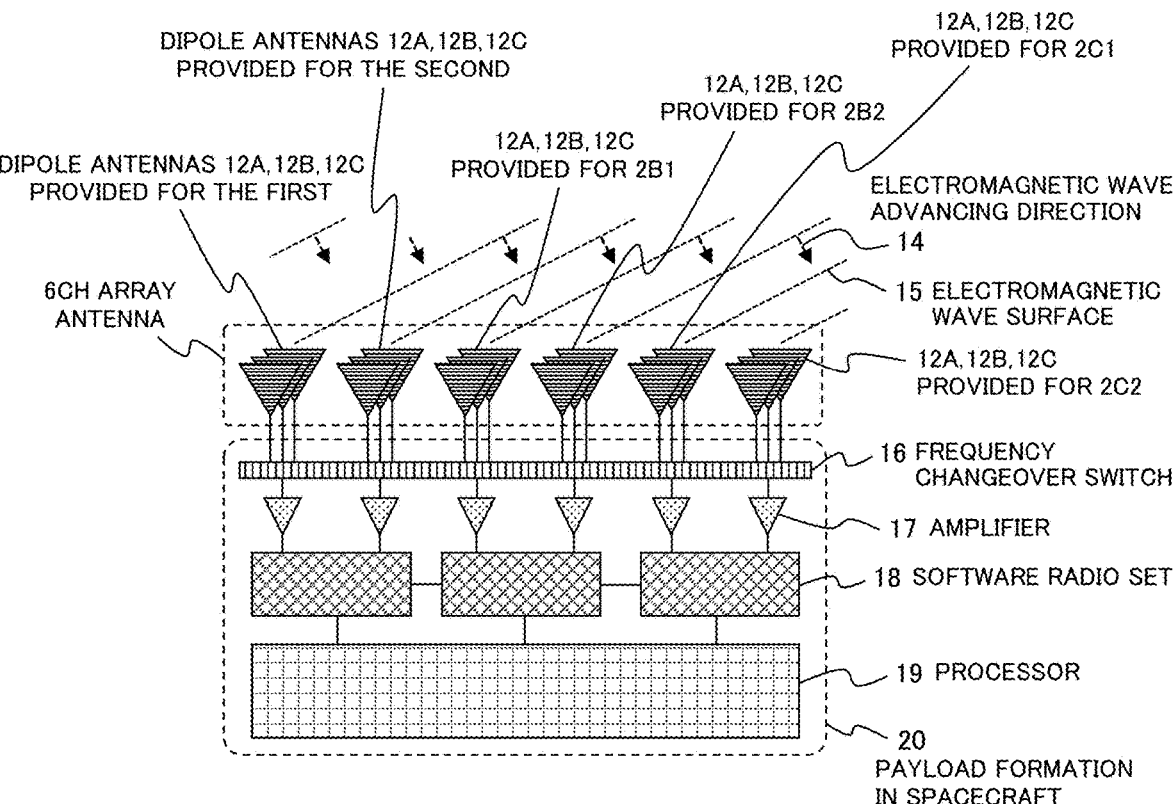
Figure 13:
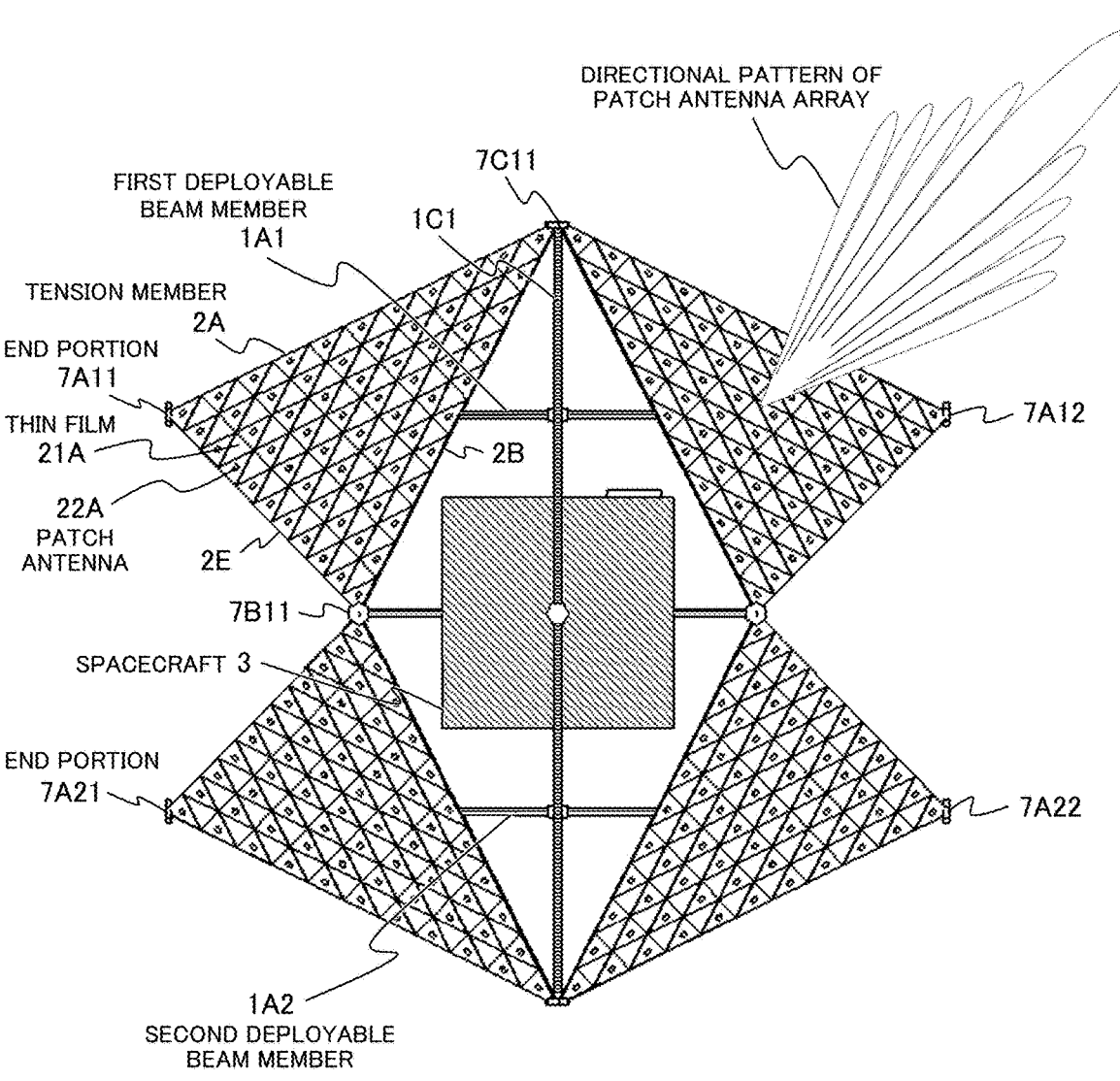
Figure 14:
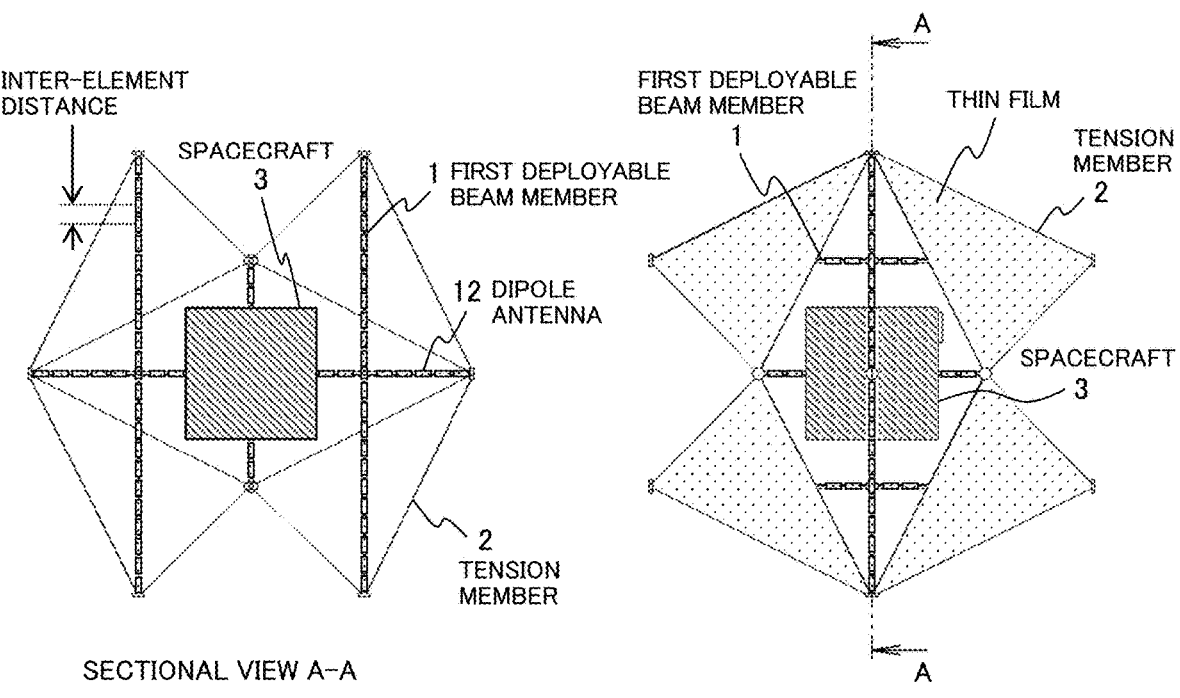
Figure 15:
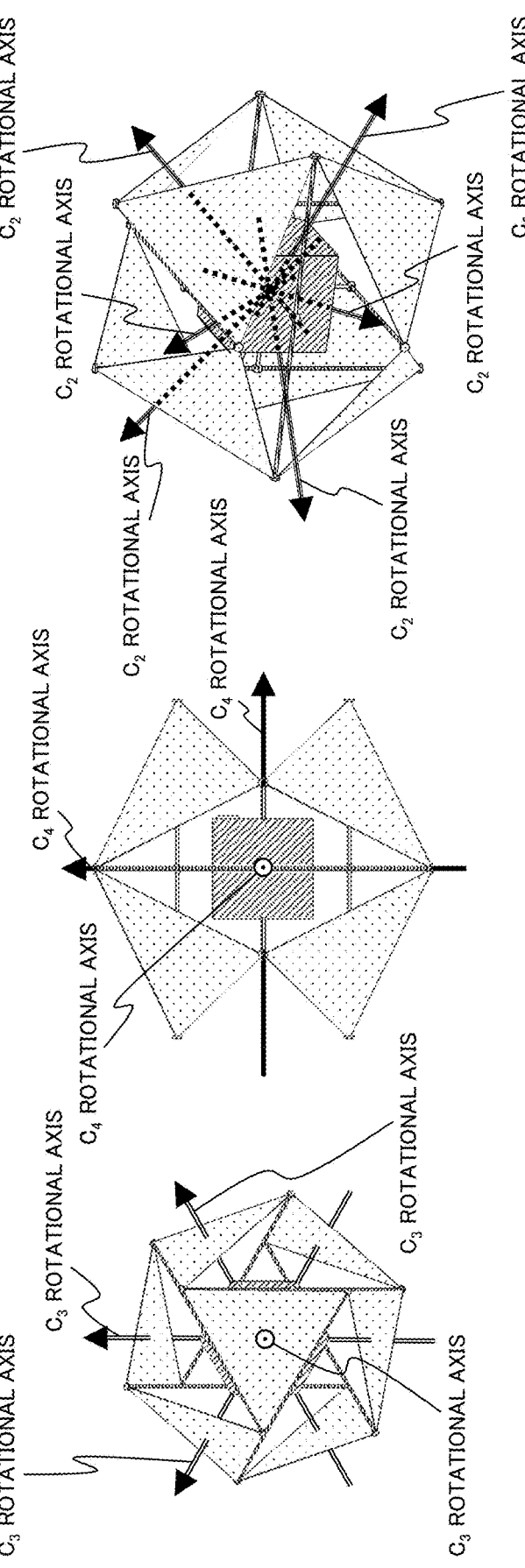
Figure 16:
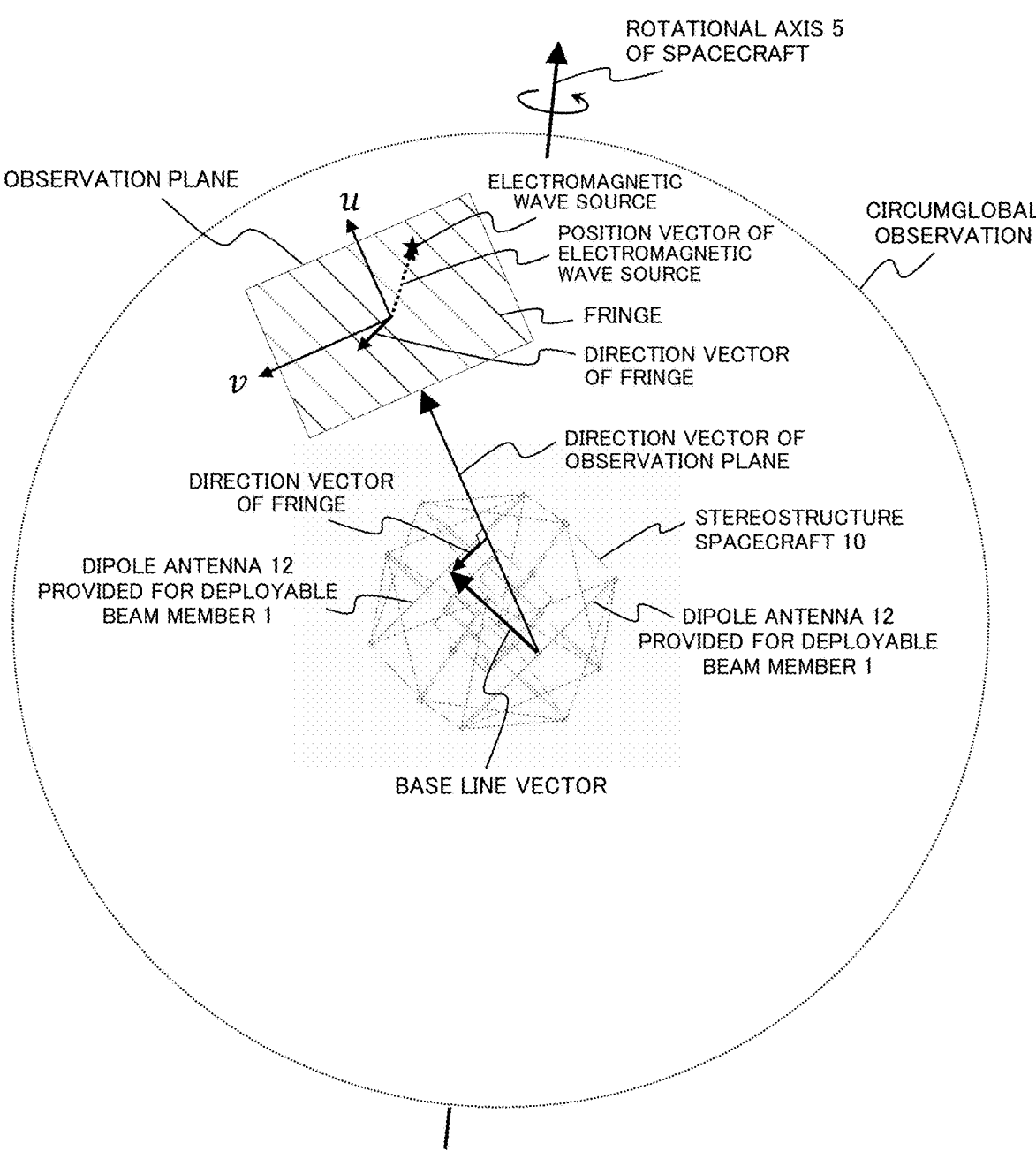
Figure 17:
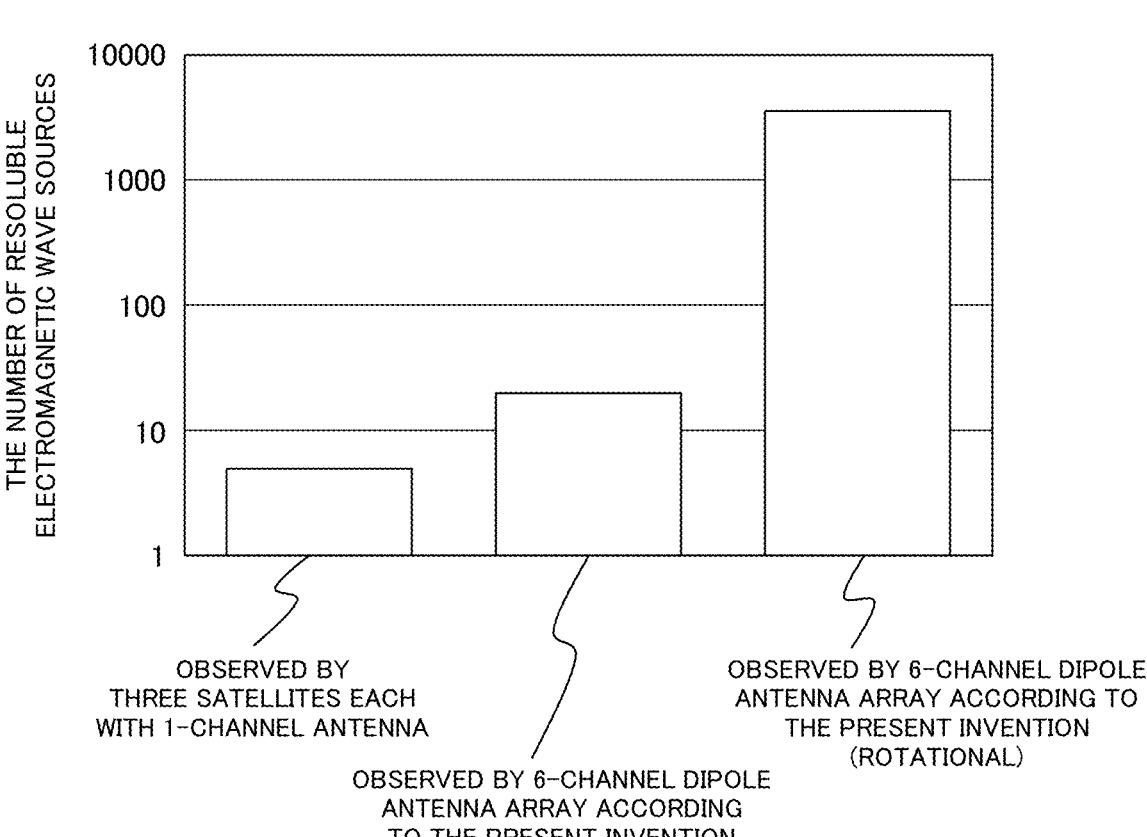
Figure 18:
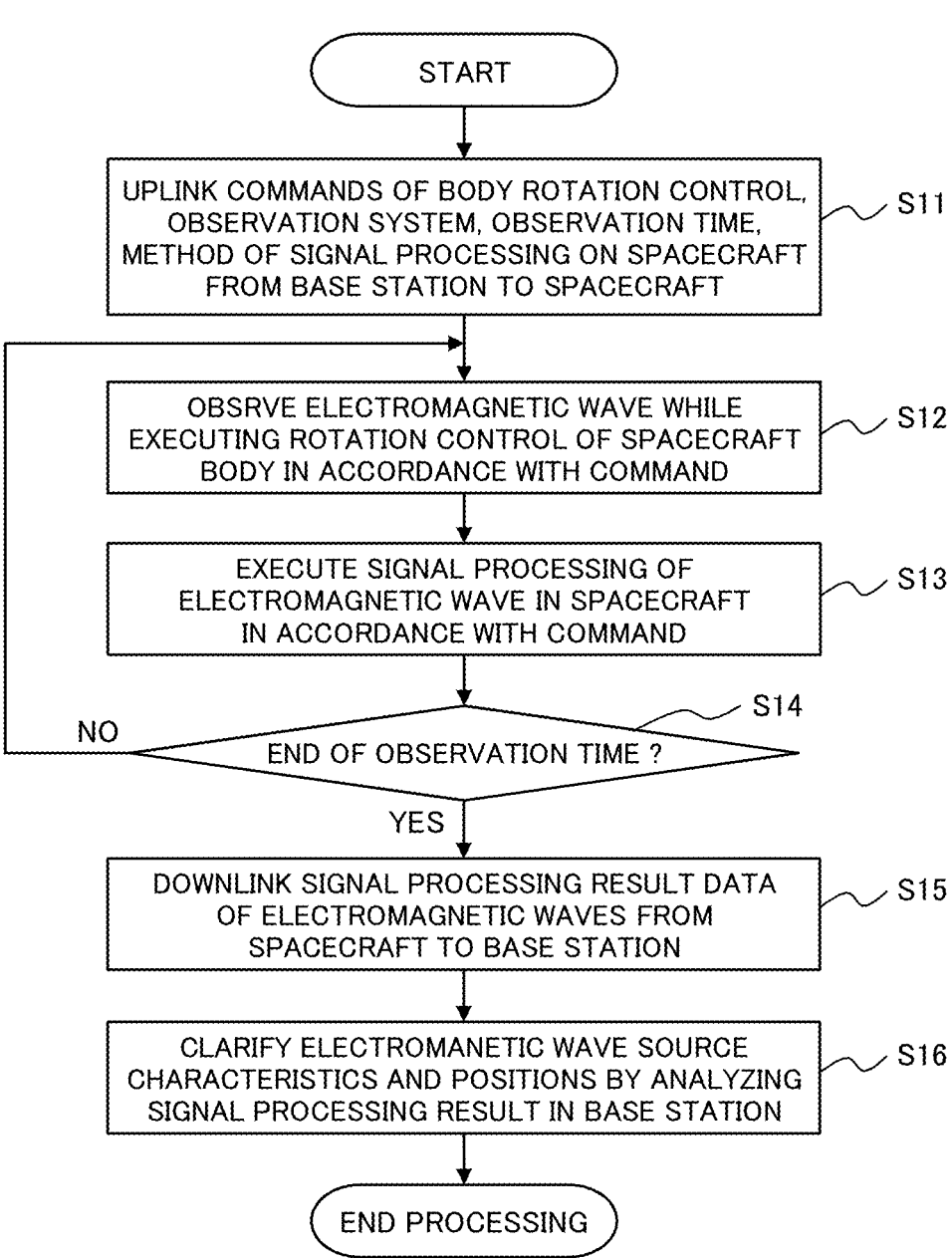
Figure 20:
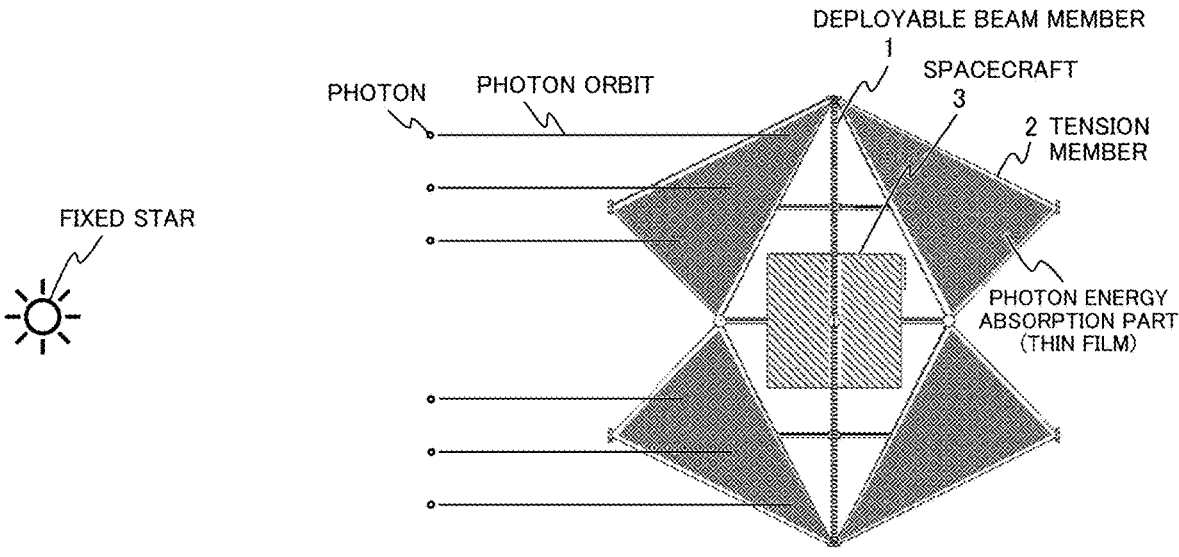
Figure 21:
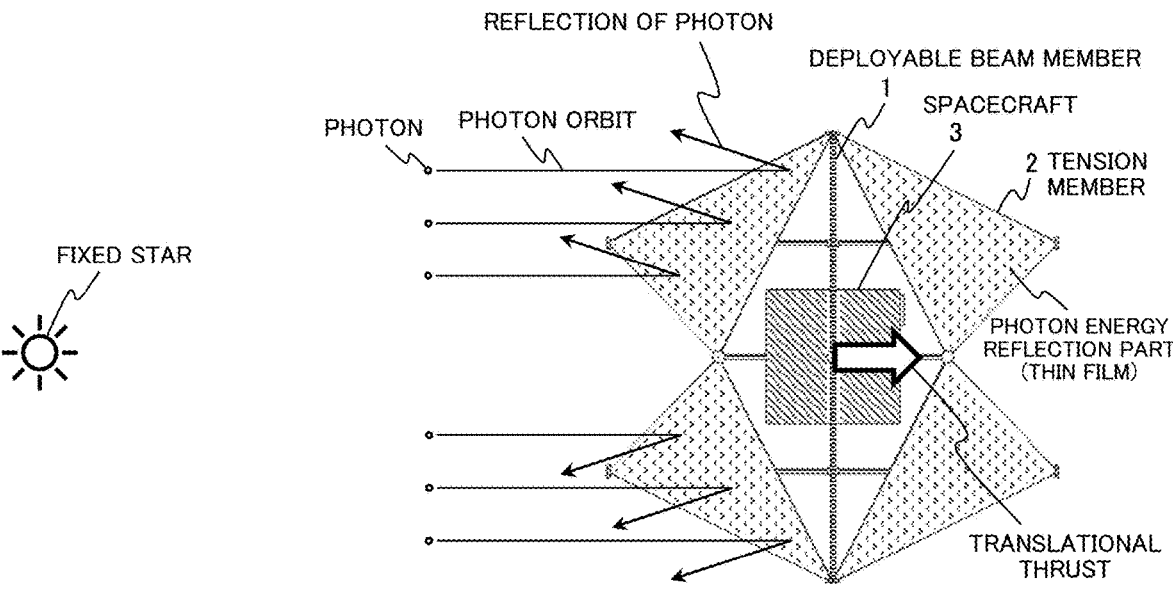
Figure 22:
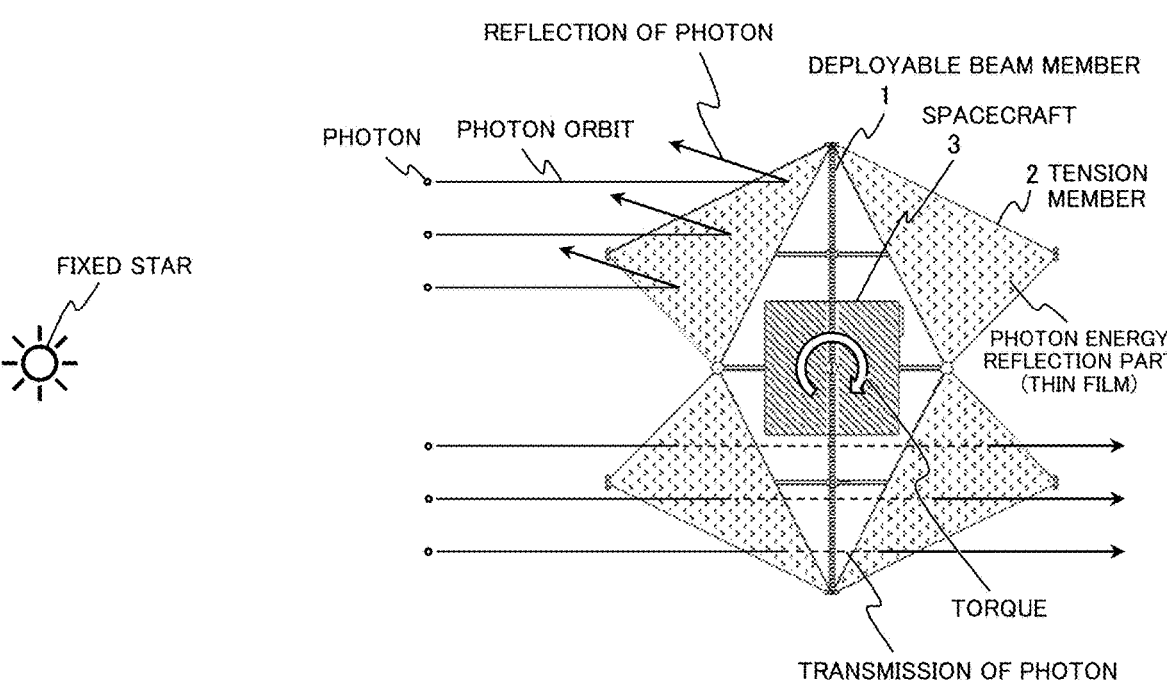

FIG. 2 illustrates a structure example of a stereostructure spacecraft according to a second embodiment of the present invention;

FIG. 3 illustrates a structure example of a stereostructure spacecraft according to a third embodiment of the present invention;

FIG. 4 illustrates a deployment process of a spacecraft 3 into an icosahedron stereostructure spacecraft 10;

Figure 5:
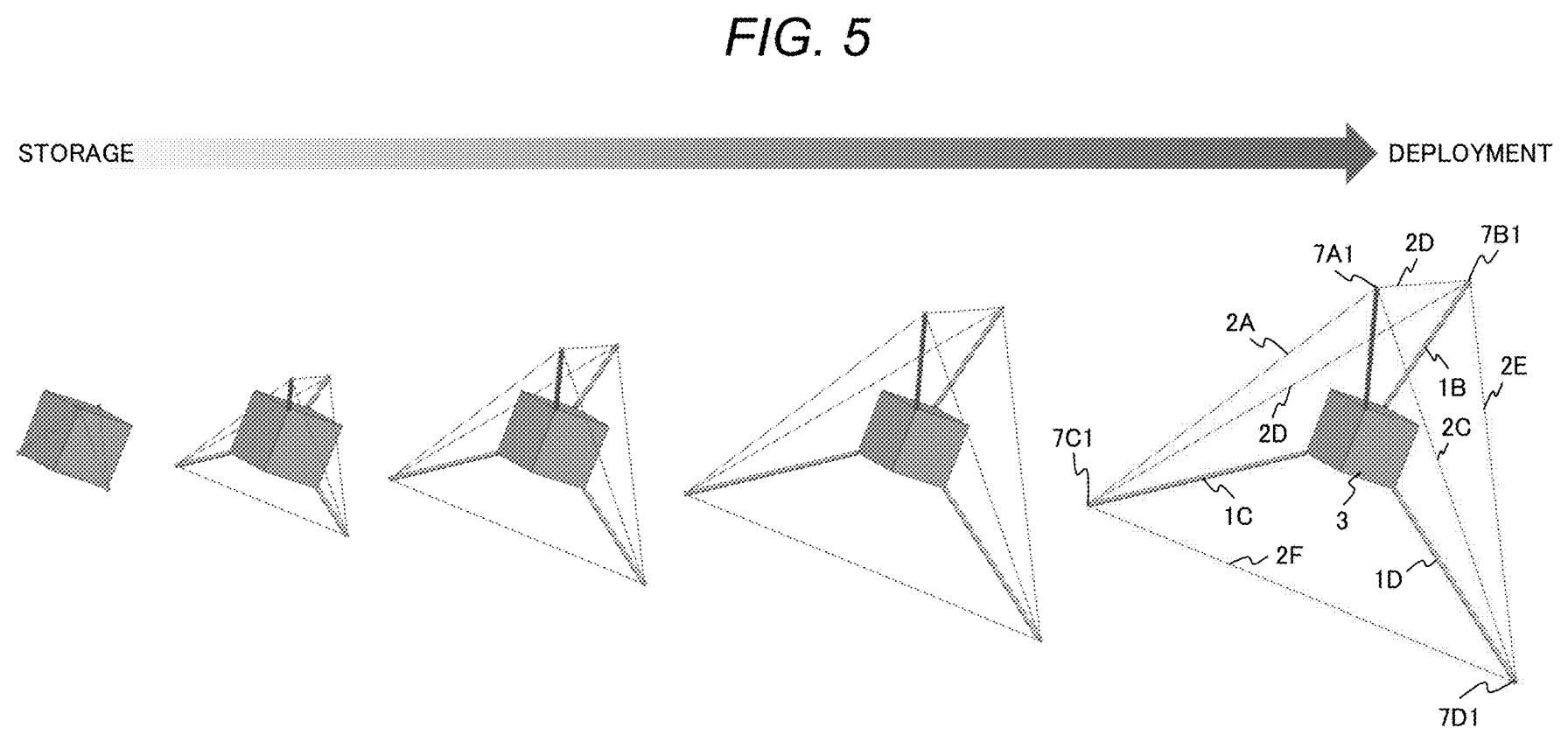

FIG. 5 illustrates a deployment process of a spacecraft 3 into a tetrahedron stereostructure spacecraft 10;

FIG. 6 illustrates a deployment process of a spacecraft 3 into an octahedral stereostructure spacecraft 10;

FIG. 7 is a sectional view of the three-dimensional structure as shown in FIG. 4, taken along the line passing through the center of the spacecraft 3;

FIG. 8 is a sectional view of a storage part 8 taken along line D-D as illustrated in FIG. 7;

Figure 9:
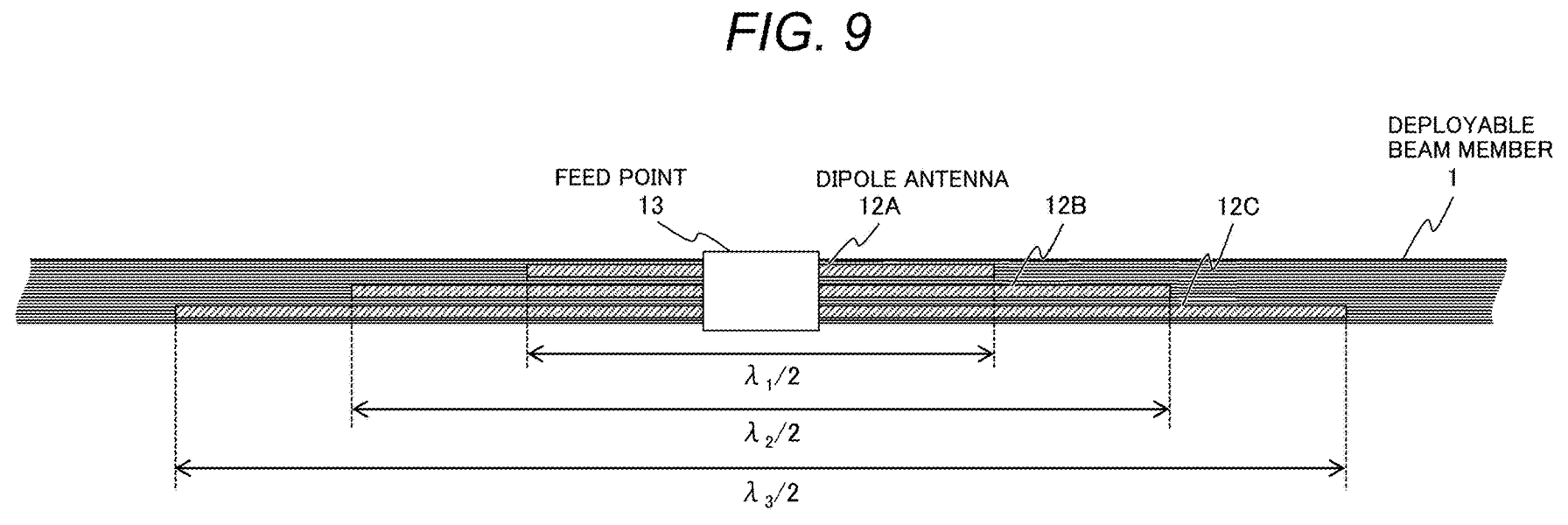

FIG. 9 illustrates a deployable beam member 1 imparted with an antenna function;

FIG. 10 illustrates a payload formation of the spacecraft;

FIGS. 11A to 11D illustrate examples of directivity patterns of the dipole antenna array;

FIGS. 12A to 12D illustrate directivity patterns of a circularly polarized wave;

FIG. 13 illustrates a thin film 21 laid over each surface of the icosahedron as illustrated in FIG. 7;

FIG. 14 illustrates an example of an antenna structure in which the deployable beam member 1 is provided with multiple antenna elements;

FIG. 15 illustrates an example of a rotational axis of the stereostructure spacecraft 10 with various polyhedral structures;

FIG. 16 illustrates a circumglobal observation in the state where the spacecraft 3 rotates about its rotational axis;

FIG. 17 represents a relation with respect to the numbers of resoluble electromagnetic wave sources when employing a 6-channel array antenna;

FIG. 18 is a flowchart for processing an omnidirectional electromagnetic wave observation using the spacecraft 3;

Figure 19:
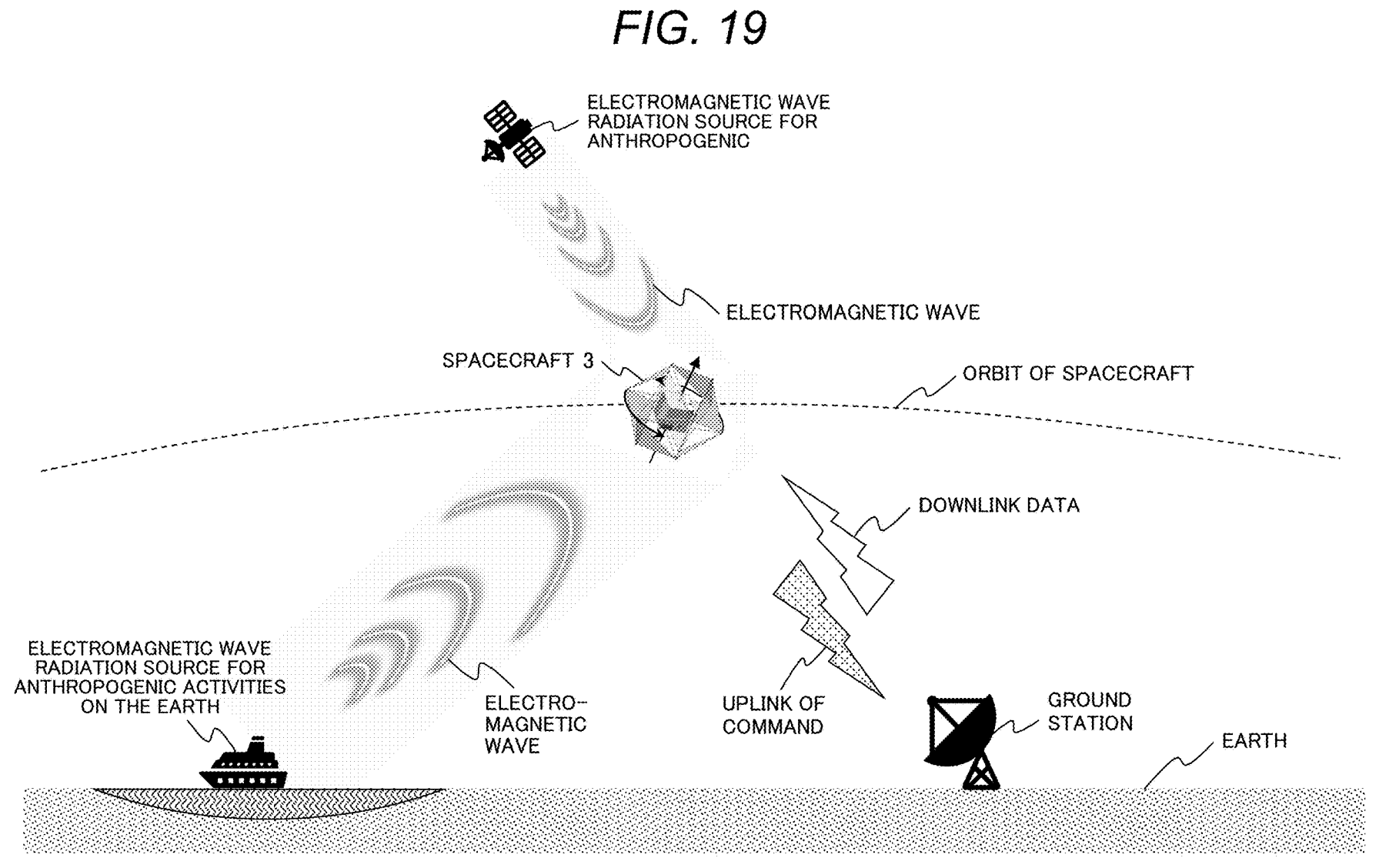

FIG. 19 illustrates a system configuration example of the omnidirectional electromagnetic wave observation;

FIG. 20 illustrates an example that the thin film part is provided with a photon energy absorption part for absorbing photons;

FIG. 21 illustrates an example that the thin film part is provided with a photon-energy reflector for reflecting photons; and FIG. 22 illustrates an example that the thin film part is provided with a photon-energy reflector for reflecting photons or a transmission part for transmitting photons.

DETAILED DESCRIPTION OF THE
PREFERRED EMBODIMENTS

Referring to the drawings, embodiments of the present invention are described.

Embodiments are described about the stereostructure spacecraft from various aspects, for example, the respective structures, deployment methods, antenna structures, and the like. The first to the third embodiments describe various structures of the stereostructure spacecraft. The fourth embodiment describes deployment of the spacecraft into the stereostructure spacecraft. The fifth embodiment describes that the antenna function is imparted to the stereostructure spacecraft. The sixth embodiment describes significance of the operation for rotating the spacecraft 3 with respect to a rotational symmetry axis 5. The seventh embodiment describes various functions implemented by the use of the thin film.

First Embodiment

In the present invention, the stereostructure spacecraft is formed into a virtual regular polyhedron having a substantial center of the spacecraft as an origin. In the first embodiment, the stereostructure spacecraft is formed into a virtual regular tetrahedron having a substantial center of the spacecraft as the origin. In spite of the "regular polyhedron" as specified in the following description, the stereostructure spacecraft is not strictly restricted to be formed into the "regular" polyhedron so long as it is formed into the polyhedron.

Figure 1:
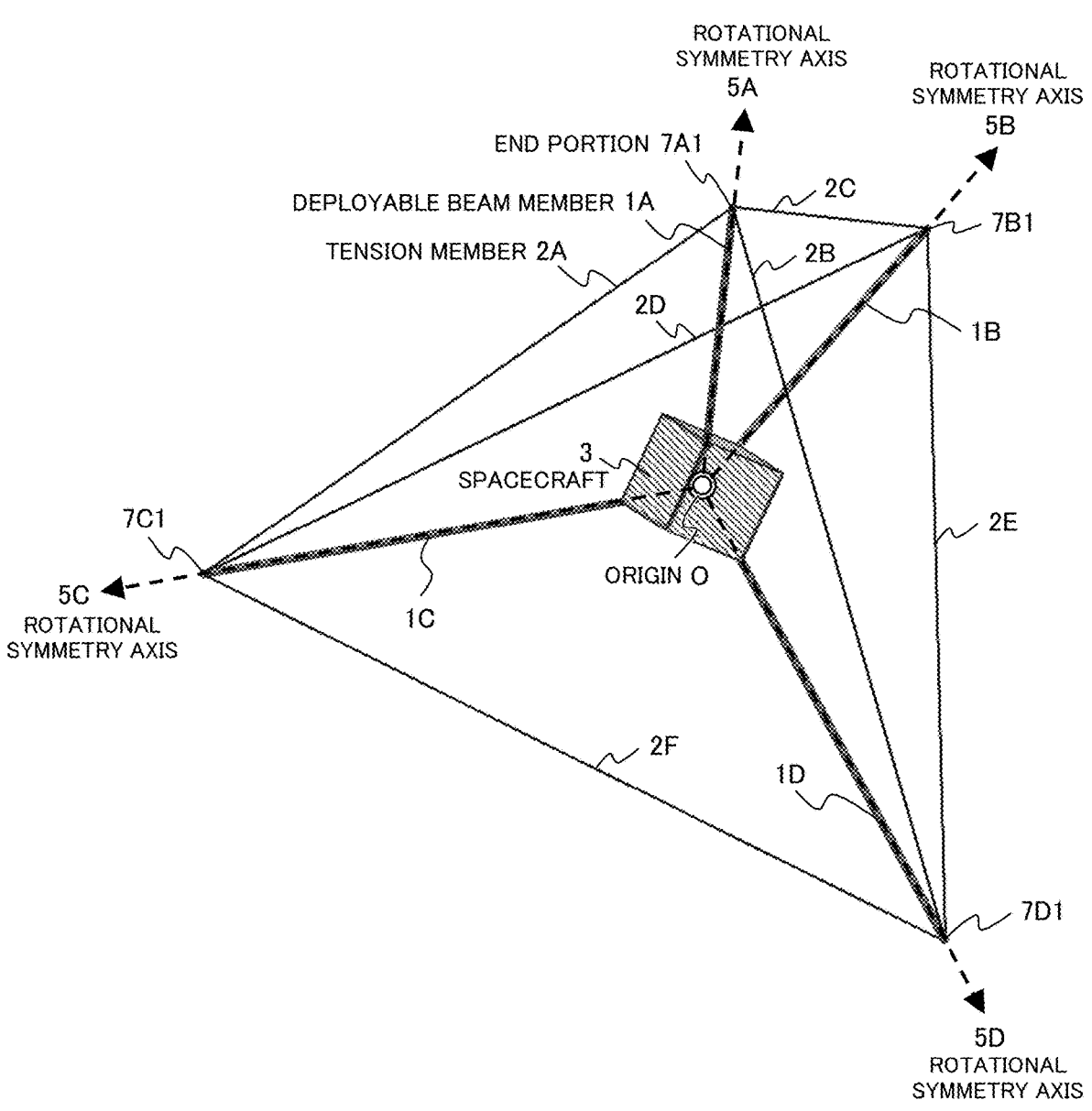
FIG. 1 illustrates a structure example of a stereostructure spacecraft according to a first embodiment of the present invention.

FIG. 1 illustrates a structure example of a stereostructure spacecraft according to a first embodiment of the present invention. A stereostructure spacecraft 10 as illustrated in FIG. 1 includes multiple deployable beam members 1, multiple tension members 2, and a spacecraft 3. The stereostructure spacecraft 10 with a virtual regular tetrahedral shape is formed using the deployable beam members 1 and the tension members 2 while surrounding the spacecraft 3.

Four deployable beam members 1, that is, 1A, 1B, 1C, 1D are equidistantly arranged along the respective rotational symmetry axes 5A, 5B, 5C, 5D of the virtual regular polyhedron from the substantial center of the spacecraft 3 as the origin O so that the regular tetrahedron is formed. Those four deployable beam members 1A, 1B, 1C, 1D are arranged while being directed toward the respective vertexes of the regular tetrahedron. End portions 7A, 7B, 7C, 7D of the deployable beam members 1A, 1B, 1C, 1D are positioned at the vertexes of the virtual regular tetrahedron, respectively.

The virtual regular tetrahedron is formed using the tension members 2, that is, six tension members 2A, 2B, 2C, 2D, 2E, 2F to support two of the end portions 7A, 7B, 7C, 7D, corresponding to two adjacent deployable beam members 1A, 1B, 1C, 1D under tension. Accordingly, the respective end portions 7A, 7B, 7C, 7D of the deployable beam members are supported with three or more of the tension members 2A, 2B, 2C, 2D, 2E, 2F simultaneously.

Arrangement of those members forms the stereostructure spacecraft 10 having the spacecraft 3 as a central structure. The deployable beam member 1 integrally incorporated in the spacecraft 3 is deployed in the illustrated direction. The deployment process is described in the embodiment as below.

The stereostructure spacecraft 10 briefly described above is discussed in more detail below. In the first embodiment, it is assumed that the regular tetrahedron is formed as the virtual regular polyhedron while having the substantial center of the spacecraft 3 as the origin O. There are multiple rotational symmetry axes 5 of the regular tetrahedron. In this embodiment, four rotational symmetry axes are directed from the substantial center at the vertexes of the regular tetrahedron. The four deployable beam members 1 stored in the spacecraft 3 are deployed equidistantly along the respective rotational symmetry axes 5. The tension member 2 supports the respective end portions 7 of the two adjacent deployable beam members 1 under tension. The respective end portions 7 of the deployable beam members 1 are supported simultaneously by three tension members 2 so that compression axial forces along the respective rotational symmetry axes 5 are applied to the deployable beam members 1. In other words, the deployable beam members 1 and the tension members 2 are positioned to keep balance between the compression force applied by the deployable beam members 1 and the tension applied by the tension members 2. The stereostructure spacecraft 10 with a substantially regular tetrahedral shape is formed around the spacecraft 3, which has four omnidirectional apertures defined by three tension members 2.

Stability of the stereostructure is examined using a Maxwell equation relating to the structure stability, which has been enhanced by Calladine (1978). The following equation (1) provides the number r of compression members, and the number t of tension members, which are necessary for stabilizing n nodes in the three-dimensional space.

$$r + t = 3n - 6 \qquad (1)$$

In the first embodiment, the number n of the nodes, that is, n=5 is obtained as a sum of 1 as the number of the spacecrafts 3, and 4 as the number of the end portions 7 of the deployable beam members 1. The sum of the numbers of the compression members and the tension members necessary for stabilizing the structure is 9. The number r of the deployable beam members 1 as the compression members is 4, and the effective number t of the tension members is 6 which has been derived from the number of sides of the regular tetrahedron. As the left side of the equation (1), that is, r+t=10 becomes larger than the right side of the equation (1), that is, 3n−6=9, it can be concluded that the structure exhibits stability.

The tension member 2 corresponding to the side of the regular tetrahedron is formed of the light wire or the light cable which has a tension function. This makes it possible to form the light tension member 2 relative to the deployable beam member 1. If the stereostructure is formed only by the compression members based on the generally structured spacecraft, the use of 9 compression members is required according to this embodiment. The spacecraft according to the first embodiment of the present invention requires the use of only four compression members. The spacecraft according to the first embodiment of the present invention becomes lighter than the generally structured spacecraft.

The first embodiment of the present invention provides the stereostructure spacecraft which has omnidirectional large apertures, and ensures lightness and form accuracy.

Second Embodiment

In the present invention, the stereostructure spacecraft is formed into a virtual regular polyhedron having a substantial center of the spacecraft as an origin. In the second embodiment, the stereostructure spacecraft is formed into a virtual regular octahedral having a substantial center of the spacecraft as the origin.

FIG. 2 illustrates a structure example of a stereostructure spacecraft according to a second embodiment of the present invention. The structure according to the second embodiment is different from the one illustrated in FIG. 1 in the number of the deployable beam members 1 and the number of the tension members 2 because of a regular octahedral shape. The basic idea, however, is analogous to the one as illustrated in FIG. 1.

In the case of the regular octahedral structure as illustrated in FIG. 2, the rotational symmetry axes 5 are formed as three orthogonal axes 6 (6A, 6B, 6C) which are orthogonal to one another. The first deployable beam members 1A1, 1B1, 1C1, and the second deployable beam members 1A2, 1B2, 1C2 along the rotational symmetry axes 5 are disposed in the positive-negative directions of the respective rotational symmetry axes 5 equidistantly from the substantial center of the spacecraft 3 as the origin so that the stereostructure spacecraft 10 is formed.

In the second embodiment, it is assumed that the regular octahedral is formed as the virtual regular polyhedron while having the substantial center of the spacecraft 3 as the origin O. There are multiple rotational symmetry axes of the regular tetrahedron. In this embodiment, three rotational symmetry axes 5 are orthogonal to one another, and directed from the substantial center to planes of the regular octahedral. The six deployable beam members 1 stored in the spacecraft 3 are deployed in the positive-negative directions along the respective rotational symmetry axes 5 equidistantly. The tension member 2 supports the respective end portions 7 of the two adjacent deployable beam members 1. The respective end portions 7 of the deployable beam members 1 are supported by four tension members 2 simultaneously so that the compression axial force along the rotational symmetry axis 5 is applied to the deployable beam member 1. In other words, the deployable beam member 1 and the tension member 2 are positioned to keep a balance between the compression force applied by the deployable beam member 1 and the tension applied by the tension member 2. The stereostructure with a substantially regular octahedral shape is formed around the spacecraft 3, which has eight omnidirectional apertures each defined by the three tension members 2.

Stability of the stereostructure is examined using the Maxwell equation as the one derived from enhancing the equation (1). In the second embodiment, the number n of the nodes, that is, n=7 is obtained as a sum of 1 as the number of the spacecrafts 3 and 6 as the number of the end portions 7 of the deployable beam members 1. The sum of the numbers of the compression members and the tension members necessary for stabilizing the structure is 15. The number r of the deployable beam members 1 as the compression members is 6, and the effective number t of the tension members is 12 which has been derived from the number of sides of the regular octahedral. As the left side of the equation (1), that is, r+t=18 becomes larger than the right side of the equation (1), that is, 3n−6=15, it can be concluded that the structure exhibits stability.

The tension member 2 corresponding to the side of the regular octahedral is formed of the light wire which has a tension function. This makes it possible to form the light tension member 2 relative to the deployable beam member 1. If the stereostructure is formed only by the compression members based on the generally structured spacecraft, the use of 15 compression members is required. The spacecraft according to the second embodiment of the present invention requires the use of only six compression members. The spacecraft 3 according to the second embodiment of the present invention can be made lighter than the generally structured spacecraft.

The present invention provides the spacecraft which has omnidirectional large apertures, and ensures lightness and form accuracy.

Third Embodiment

In the present invention, the stereostructure spacecraft is formed into a virtual regular polyhedron having a substantial center of the spacecraft as an origin. In the third embodiment, the stereostructure spacecraft is formed into a virtual regular icosahedron having a substantial center of the spacecraft as the origin.

FIG. 3 illustrates a structure example of a stereostructure spacecraft according to a third embodiment of the present invention. The structure according to the third embodiment is different from the one illustrated in FIGS. 1 and 2 in the number of the deployable beam members 1 and the number of the tension members 2 because of a regular icosahedron shape. The basic idea, however, is analogous to the one as illustrated in FIG. 1.

In the case of the regular icosahedral structure as illustrated in FIG. 3, the rotational symmetry axes 5 are formed as three orthogonal axes 6 (6A, 6B, 6C) which are orthogonal to one another. The first deployable beam members 1A1, 1B1, 1C1, and the second deployable beam members 1A2, 1B2, 1C2 are disposed equidistantly in the positive-negative directions so that the respective longitudinal directions are orthogonal to the rotational symmetry axes 5 each having the substantial center of the spacecraft 3 as the origin. The stereostructure spacecraft is then formed.

In the third embodiment, it is assumed that the regular icosahedron is formed as the virtual regular polyhedron while having the substantial center of the spacecraft 3 as the origin O. There are multiple rotational symmetry axes of the regular icosahedron. In this embodiment, three rotational symmetry axes 5A, 5B, 5C are orthogonal to one another, and directed from the substantial center to planes of the regular hexahedron. The six deployable beam members 1 (first deployable beam members 1A1, 1B1, 1C1, and the second deployable beam members 1A2, 1B2, 1C2) stored in the spacecraft 3 are disposed in the positive-negative directions with respect to the rotational symmetry axes 5A, 5B, 5C, and deployed toward the directions orthogonal to the rotational symmetry axes 5A, 5B, 5C, respectively. The tension member 2 supports the respective end portions 7 of the two adjacent deployable beam members 1. The respective end portions 7 of the deployable beam members 1 are supported by four tension members 2 simultaneously so that the compression axial forces in the directions orthogonal to the respective rotational symmetry axes 5A, 5B, 5C are applied to the deployable beam members 1.

In other words, the deployable beam member 1 and the tension member 2 are positioned to keep a balance between the compression force applied by the deployable beam member 1 and the tension applied by the tension member 2. The stereostructure with a substantially regular octahedral shape is formed around the spacecraft 3, which has fourteen apertures each defined by the tension members 2. As each distance between the deployable beam members 1 disposed in the positive-negative directions with respect to the rotational symmetry axes 5A, 5B, 5C is reduced, the stereostructure is gradually transformed into the regular octahedron. As each distance between the deployable beam members 1 extends, the stereostructure is gradually transformed into a cuboctahedron. In this embodiment, the stereostructure is substantially formed as a Jessen's icosahedron for keeping the balance between the compression force and the tension.

Stability of the stereostructure is examined using the Maxwell equation as the one derived from enhancing the equation (1). Stability of the stereostructure is examined using the Maxwell equation as the one derived from enhancing the equation (1). In this embodiment, the number n of the nodes is 12, that is, the number of the end portions 7 of the deployable beam members 1. Accordingly, the sum of the numbers of the compression members and the tension members necessary for stabilizing the structure is 30. The number r of the deployable beam members 1 as the compression members is 6, and the effective number t of the tension members is 24 which has been derived from the number of sides of the regular octahedron. As the left side of the equation (1), that is, r+t=30 is equal to the right side of the equation (1), that is, 3n−6=30, it can be concluded that the structure exhibits stability.

The tension member 2 corresponding to each side of the Jessen's icosahedron is formed of the light wire which has a tension function. This makes it possible to form the light tension member 2 relative to the deployable beam member 1. If the stereostructure is formed only by the compression members based on the generally structured spacecraft, the use of 30 compression members is required. The spacecraft according to the third embodiment of the present invention requires the use of only six compression members. Accordingly, the spacecraft according to the third embodiment of the present invention becomes lighter than the generally structured spacecraft.

The third embodiment of the present invention provides the spacecraft which has three orthogonal axes and omni-directional large apertures, and ensures lightness and form accuracy.

Fourth Embodiment

According to the present invention, the spacecraft 3 is deployed into the stereostructure spacecraft 10. A fourth embodiment describes each deployment process into structures with various polyhedral shapes as described above.

FIG. 4 illustrates the deployment process from the spacecraft 3 to the stereostructure spacecraft 10 with icosahedral shape. The left side of the drawing shows the state where the tension members 2 and the deployable beam members 1 are integrally incorporated into the spacecraft 3. From this state, the tension members 2 and the deployable beam members 1 are sequentially deployed into the stereostructure spacecraft 10 constituted by the tension members 2 and the deployable beam members 1 while surrounding the spacecraft 3. In the subsequent stage, thin films are laid over the respective planes defined by the tension members 2 and the deployable beam members 1. In this stage, however, the deployed structure is in a skeletal state with no thin film overlaid.

The deployment process is described on the assumption that a cuboidal CubeSat is employed as the spacecraft 3. As the deployable beam member 1 is formed using a shape memory alloy or a convex tape material which applies the restoring force to the folded part so that, in the initial stage (prior to the deployment) at the left side of FIG. 4, the deployable beam member 1 can be stored cubically in the spacecraft 3.

Upon storage, the tension member 2 is in a flexed state where no tension is applied. In the initial stage of deployment, the restoring force of the deployable beam member 1 of its own acts to cause the deployment. As the deployment progresses, the tension member 2 extends to apply tension to the end portion 7 of the deployable beam member 1.

In the end, the deployable beam member 1 and the tension member 2 are positioned so that the compression force of the deployable beam member 1 and the tension of the tension member 2 are kept balanced. Storage of those members adaptively to the rocket allows formation of the spacecraft with omnidirectional large apertures in an economical way without increasing the transportation cost.

Next, FIG. 5 illustrates the deployment process from the spacecraft 3 to the stereostructure spacecraft 10 with tetrahedron shape. FIG. 6 illustrates the deployment process from the spacecraft 3 to the stereostructure spacecraft 10 with octahedral shape. Referring to FIG. 5 and FIG. 6, at the left side, the tension members 2 and the deployable beam members 1 are integrally incorporated into the spacecraft 3. From this state, the tension members 2 and the deployable beam members 1 are sequentially deployed into the stereostructure spacecraft 10 having either the tetrahedral or octahedral structure constituted by the tension members 2 and the deployable beam members 1 while surrounding the spacecraft 3. FIG. 5 and FIG. 6 show that those members are extended in directions of the rotational symmetry axes.

The deployment process as illustrated in FIG. 5 and FIG. 6 is described on the assumption that a cuboidal CubeSat is employed as the spacecraft 3. The deployable beam member 1 which is extendable in the direction of the rotational axis 5 can be stored in the spacecraft 3. Insertion of an axle spring into the deployable beam member 1 may impart the restoring force in the extending direction to the deployable beam member 1. Upon storage, the tension member 2 is in a flexed state where no tension is applied.

In the initial stage of deployment, the restoring force of the deployable beam member 1 of its own acts to cause the deployment. As the deployment progresses, the tension member 2 extends to apply tension to the end portion 7 of the deployable beam member 1.

In the end, the deployable beam member 1 and the tension member 2 are positioned so that the compression force of the deployable beam member 1 and the tension of the tension member 2 are kept balanced. Storage of those members adaptively to the rocket allows formation of the spacecraft with omnidirectional large apertures in an economical way without increasing the transportation cost.

Referring to FIG. 7 and FIG. 8, an explanation is made about the specific deployment mechanism of the icosahedral structure as illustrated in FIG. 4. FIG. 7 is a sectional view of the three-dimensional structure as illustrated in FIG. 4, taken along the line passing through the center of the spacecraft 3. As the drawing illustrates, the deployable beam member 1 to be deployed in the direction orthogonal to the rotational symmetry axis 5 is stored in a storage part 8 (8C1 in the drawing) in the spacecraft 3 as illustrated in FIG. 7. FIG. 8 is a sectional view of the storage part 8 taken along line D-D as illustrated in FIG. 7.

As FIG. 8 illustrates, the deployable beam member 1 is stored in the storage part 8 while being spirally wound like a mosquito coil. In this state, a pair of deployable beam members 1 are stored while extending in the positive-negative directions on the same straight line so that those members extend by the same length simultaneously. The drawing shows a shaft 10, a roller 11, and a guide roller 9.

In this embodiment, the deployable beam member 1 is wound around the roller 11. The deployable beam member 1 is formed of such material as a convex tape so that the restoring force is applied to the flexure. Referring to FIG. 8, during deployment, the roller 11 rotates counterclockwise, and the deployable beam member 1 longitudinally extends. The restoring force of the deployable beam member 1 of its own, and the tension of the tension member 2 are used for deployment so that the deployable beam member 1 and the tension member 2 are positioned to balance the compression force of the deployable beam member 1 and the tension of the tension member 2. Storage of those members adaptively to the rocket allows formation of the spacecraft 3 with omnidirectional large apertures in an economical way without increasing the transportation cost.

Fifth Embodiment

The fifth embodiment describes that the antenna function is imparted to the stereostructure spacecraft 10.

FIG. 9 illustrates the deployable beam member 1 imparted with an antenna function. The drawing shows a cross-section of the deployable beam member 1 in which a feed point 13 and dipole antennas 12 (12A, 12B, 12C) are disposed. Multiple antennas are prepared in accordance with the wavelength A of the electromagnetic wave to be captured.

For arrangement of the antennas as illustrated in FIG. 9, the deployable beam member 1 has a predetermined length to satisfy the need of forming the large-sized stereostructure 10 around the spacecraft 3. As the cross-section area is set so as not to cause buckling, the conductive antenna elements 12 can be disposed along the deployable beam member 1 as illustrated in the drawing. The conductive antenna elements 12 are disposed in the left-right extending directions with respect to the feed point 13 as the deployment center. This makes it possible to form the dipole antenna. It is known that the wavelength A of the resonance frequency of the dipole antenna is approximately half the length of the dipole antenna. The use of dipole antenna elements each having different length on the deployable beam member 1 allows provision of the antennas 12 adapted to different frequencies for the deployable beam member 1.

If the spacecraft has multiple antennas adapted to different frequencies, the payload of the spacecraft may be configured as illustrated in FIG. 10. In this case, six deployable beam members 1 as illustrated in FIG. 2 or FIG. 3 (six members including the first deployable beam members 1A1, 1B1, 1C1, and the second deployable beam members 1A2, 1B2, 1C2) for forming the 6-channel array antenna are utilized to form the 6-channel array antenna. In the illustrated example, a group of three dipole antennas 12A, 12B, 12C is disposed for each of those deployable beam members 1. The drawing shows an advancing direction 14 of the electromagnetic wave, and a surface 15 of the electromagnetic wave.

A payload formation 20 in the spacecraft 3 includes a changeover switch 16 of a signal received by the 6-channel array antenna, an amplifier 17, a software radio set 18, a processor 19 for processing signals, and the like.

FIG. 10 is a block diagram of the payload formation in the spacecraft 3. Multiple dipole antennas 12 provided for the deployable beam members 1 can be selectively used by the frequency changeover RF (radio wave frequency) switch 16. When using six deployable beam members 1, six antennas can be used simultaneously. Electromagnetic wave signals observed by the six dipole antennas 12 are converted into electric signals, and amplified by the amplifier 17 so that the signals are received by the software radio set 18. The respective software radio sets 18 perform synchronous sampling to execute correlation processing on the processor. This makes it possible to obtain the advancing direction of the electromagnetic wave.

Synchronization of six dipole antennas 12 allows usage of those antennas as the 6-channel dipole antenna array. If an inter-antenna distance is sufficiently short relative to the wavelength, the directivity pattern of the dipole antenna array is expressed as illustrated in FIGS. 11A to 11D.

The dipole antenna 12 as a single unit has a doughnut-type directivity pattern having an axis as a center. In the embodiment, each distance between the dipole antennas is short relative to the wavelength. The dipole antenna array, however, shows directivity patterns by interference as illustrated in FIGS. 11A to 11D. The 6-channel dipole antenna array has symmetry axes in four directions. Accordingly, four directivity patterns shown in FIGS. 11A to 11D can be obtained in accordance with a reference axis. Each of the patterns shown in FIGS. 11A to 11D has a different null direction of the antenna, that is, a different direction of low receiver sensitivity. This makes it possible to select the null direction in accordance with a target to be received. The present invention allows arbitrary formation of the omnidirectional antenna directivity pattern.

FIGS. 11A to 11D illustrate the dipole antenna array three-dimensionally for readily understanding of correlations among the rotational symmetry axes, the null receiving direction, the deployable beam member 1 constituting the dipole antenna, the dipole antenna directivity pattern, and the inter-antenna distance.

Referring to FIGS. 12A to 12D, it is possible to form the directivity pattern of the circularly polarized wave of the 6-channel dipole antenna array having the symmetry axes C3, that is, having 1200 rotational symmetry through reception or transmission at an angular interval of 120°.

In this embodiment, four circularly polarized wave patterns shown in FIGS. 12A to 12D can be obtained in accordance with a reference axis. Each receiving direction with high receiving sensitivity of the patterns shown in FIGS. 12A to 12D is different from each other. This makes it possible to select the direction in accordance with a target to be received. The present invention allows formation of the spacecraft capable of radiating or receiving electromagnetic waves omnidirectionally in ranges of various frequencies and directivities.

Referring to FIG. 9, the antenna function is implemented using the deployable beam members 1. Such function can be made further feasible by the structure as illustrated in FIG. 13. The explanation has been made about the stereostructure spacecraft 10 with a polyhedral structure as a frame constituted by the deployable beam members 1 and the tension members 2 while surrounding the spacecraft 3. Actually, the structure is further subjected to the subsequent process for forming a substantial planar structure by laying the thin film over the respective planes defined by the deployable beam members 1 and the tension members 2.

In another case of providing the antenna, the antenna is formed on the surface overlaid with the thin film. FIG. 13 illustrates a thin film 21 laid over each plane as illustrated in FIG. 7. A patch antenna 22 is further provided on the thin film 21.

Referring to an exemplary skeletal structure as illustrated in FIG. 7, the structurally stable thin film 21 is laid over the plane defined by the tension members 2 as illustrated in FIG. 13. This makes it possible to form a patch antenna array provided with thin-film-like patch antennas 22. Synchronization of the patch antenna array phase allows formation of the directivity pattern with sharp directivity as illustrated in FIG. 13. As the above-described structure includes eight aperture planes omnidirectionally, it is possible to form the transmission/reception antenna with sharp directivity.

FIG. 14 illustrates an example of the antenna structure in which the deployable beam member 1 is provided with multiple antenna elements. Referring to the cross-section at the left side of FIG. 14, taken along line A-A of the structure at the right side, multiple dipole antenna elements 12 are disposed in the longitudinal directions of the respective deployable beam member 1.

As FIG. 14 illustrates, the deployable beam member 1 has a predetermined length to satisfy the need of forming a large-sized stereostructure around the spacecraft 3. In this embodiment, multiple dipole antenna elements 12 are disposed at predetermined intervals in the respective longitudinal directions of the deployable beam members 1 to form the dipole antenna array on the deployable beam member 1.

The elements are arranged at the interval sufficiently short relative to the wavelength. This allows reception and transmission with a sharp directivity pattern.

In the latter process as described above, the stereostructure spacecraft 10 has the thin film laid over the planes for forming the polyhedron rather than the mere skeletal structure. The resultant structure has the thin film laid over the plane defined by three or more tension members 2 via the respective end portions 7 of the deployable beam member 1. The antenna can be provided for at least any one or more of the deployable beam member 1, the tension member 2, and the thin film to allow radiation or reception of electromagnetic waves.

Sixth Embodiment

The sixth embodiment describes significance of the operation for rotating the spacecraft 3 with respect to a rotational symmetry axis 5. The stereostructure spacecraft is rotated with respect to the rotational symmetry axis 5 to receive electromagnetic waves.

The spacecraft 3 receives electromagnetic waves while rotating with respect to multiple rotational symmetry axes 5 to analyze the received electromagnetic wave containing rotation information, and downlinks the analysis result to a ground station. The ground station is allowed to examine the analysis pattern change in accordance with the orbit condition and the rotation information of the spacecraft. This makes it possible to apply the obtained information to identification of the electromagnetic wave characteristic and the electromagnetic wave source position. It is possible to identify the electromagnetic wave characteristic and the electromagnetic wave source position in orbit so long as the spacecraft 3 has sufficient calculation resources.

FIG. 15 illustrates an example of the rotational axis of the stereostructure spacecraft 10 with various polyhedral structures. As described herein, there are multiple rotational axes. For example, assuming that the array antenna 12 is provided for the stereostructure with icosahedral shape as described referring to FIG. 3 around the spacecraft 3, there are 13 rotational symmetry axes. In this case, the term Cn (n is an integer equal to or larger than 2) represents an operation to the rotation at $2\pi/n$ [rad] about an arrowed axis as illustrated in FIG. 15. The array antenna 12 is formed to exhibit high rotational symmetry. The use of a 3-axis reaction wheel inside the satellite allows observation of electromagnetic waves during rotation with respect to the 13 rotational symmetry axes as illustrated in FIG. 15. When taking a non-rotational operation (identical transformation) E into account, 14 array antennas in total can be used for observing under the operation of $O=\{4C_3, 3C_4, 6C_2, E\}$.

The characteristic as described above allows omnidirectional electromagnetic wave observation using rotational operations as described below. FIG. 16 illustrates a circumglobal observation when the spacecraft 3 rotates with respect to the rotational axis.

Rotation of the spacecraft 3 with respect to the rotational axis enables the circumglobal analysis of the electromagnetic wave source around the spacecraft 3. In this embodiment, for simplifying the explanation, it is assumed that the electromagnetic wave source in the direction vector s+σ from the spacecraft remains stationary in a two-dimensional observation plane (u, v). An electromagnetic wave interferometer locates the electromagnetic wave source position utilizing a strong-weak pattern (hereinafter referred to as a fringe) as the interference fringe generated upon interference output of the electromagnetic wave arriving a pair of array antennas from the electromagnetic wave source. In other words, the phase difference occurs in the electromagnetic wave owing to the difference between a distance vector B(t) between the array antennas, and the direction vector of the electromagnetic wave source. If the electromagnetic wave source exists between fringe lines, the interference output becomes weak. If the electromagnetic wave source exists on the fringe line, the interference output becomes strong.

The spacecraft 3 can perform measurements during a rotational operation, and accordingly, a base line vector becomes a function of time. The direction vector of the fringe in the observation plane also becomes a function of time. As a result, the interference output fluctuates (hereinafter referred to as a fringe pattern) in accordance with the rotation. The 6-channel array antenna provides 15 fringe patterns in total. Those 15 fringe patterns are observed and analyzed by performing 14 rotational operations in total. This makes it possible to perform mapping of the direction of the electromagnetic wave source in almost all solid angle of $4n$ steradians.

FIG. 17 represents a relation with respect to the numbers of resoluble electromagnetic wave sources when employing the 6-channel array antenna according to the present invention. In conclusion, the number of the resoluble electromagnetic wave sources used for observation by three satellites having 1-channel antenna is five. On the contrary, the number of the resoluble electromagnetic wave sources used for observation (non-rotational) by the 6-channel dipole antenna array according to the present invention is 20. The number of the resoluble electromagnetic wave sources used for observation (rotational) by the 6-channel dipole antenna array according to the present invention is several thousands.

As described above, the spacecraft according to this embodiment is capable of observing electromagnetic waves under a total of 14 operations of $O=\{4C_3, 3C_4, 6C_2, E\}$. In this embodiment, the spacecraft includes six dipoles while having three axes of X, Y, Z orthogonal to one another. Accordingly, the observation electromagnetic field data can be represented as a six-dimensional vector as expressed by the following equation (2).

$$F(p) = [E_{x1}(p), E_{x2}(p), E_{y1}(p), E_{y2}(p), E_{z1}(p), E_{z2}(p)]^T \qquad (2)$$

In the equation (2), the item $[\ ]^T$ denotes the vector transpose, and E denotes the electric field derived from the dipole antenna. The observation data derived from the operation O can be expressed by the following equation (3).

$$F(p, O) =  \qquad (3)$$
$$[E_{x1}(p, O), E_{x2}(p, O), E_{y1}(p, O), E_{y2}(p, O), E_{y3}(p, O), E_{y3}(p, O)]^T$$

According to the interferometry, a covariance matrix CF (p, O) of the observation data derived from the equation (3) is obtained by the following equation (4).

$$C_F(p, O) = F(p, O) F(p, O)^H \qquad (4)$$

The item $(\ )^H$ denotes a complex conjugate transposition. The covariance matrix CF (p, O) of the observation data has $N^2=36$ elements as the number N of antennas is 6. As this matrix is a symmetric matrix, the resultant information dimension is $N(N+1)/2=21$. The number of the resoluble electromagnetic wave sources which can be determined based on the second order statistics is smaller than the information dimension by one. Accordingly, the number in the non-rotational condition becomes 20 at a maximum.

If an invariant phase reference signal is available in the operation O, and the observation time is not considered, it is possible to calculate the covariance between the observation signals under the respective operations. If the number of the antennas is six, the number of observation signals is $N=6\times 14=84$. Assuming that all observation signals are independent, the number of the resultant information dimensions is 3570. Accordingly, the number of resoluble electromagnetic wave sources is at a maximum of 3569 in the case of the rotational operation.

The left bar graph in FIG. 17 shows an example of the generally structured spacecraft, specifically, the number of resoluble electromagnetic wave sources of the spacecraft for the probe of electromagnetic wave source by constellation of three satellites which have been already operated in outer space. As each of those satellites uses information of one antenna, the information dimension is derived from 3×4/2. The number of resoluble electromagnetic wave sources becomes five. As the right bar graph in FIG. 17 shows, the present invention allows detailed analysis of the omnidirectional electromagnetic wave sources by receiving and analyzing the electromagnetic waves including the rotation information.

FIG. 18 is a flowchart for processing the omnidirectional electromagnetic wave observation using the spacecraft 3 according to the embodiment. FIG. 19 illustrates a system configuration example of the omnidirectional electromagnetic wave observation.

Referring to the system configuration example in FIG. 19, the spacecraft 3 orbiting around the earth receives electromagnetic waves from the electromagnetic wave transmitting source concerning anthropogenic activities on the earth, and those from the electromagnetic wave transmitting source concerning anthropogenic activities in outer space, and communicates with the ground station (base station) built on the earth (downlinking of data, or updating of commands). The spacecraft 3 is arranged in various orbits, for example, a low orbit, a medium orbit, a geostationary orbit, and a Cislunar orbit in accordance with an observation target. The drawing illustrates the spacecraft arranged in the low orbit.

In the configuration as described above, the omnidirectional electromagnetic waves are observed using the spacecraft 3 in the following procedure. In step S11, the ground station uplinks commands to the spacecraft 3, which relate to an operation for the machine body rotational control, an observation system, observation time, and a signal processing method implemented in the spacecraft field. In step S12, the spacecraft 3 observes electromagnetic waves while controlling rotational operations of the machine body in accordance with the command. All types of electromagnetic waves around the spacecraft are observed, for example, incoming electromagnetic waves from the electromagnetic wave radiation source concerning the anthropogenic activities on the earth or from the electromagnetic wave radiation source concerning the anthropogenic activities in outer space.

In step S12, the spacecraft processes an electromagnetic wave signal in accordance with the command. The observation process is continuously executed in step S12 until the end of the observation time.

In process step S14, subsequent to the observation processing, the signal processing is executed, for example, electromagnetic wave interference, and covariance of the electromagnetic wave as described above. At the end of the observation time, the signal processing result is downlinked from the spacecraft 3 to the ground station in process step S15. Finally, in process step S16, the ground station clarifies characteristics and positions of the electromagnetic wave sources through analysis with reference to the signal processing result, the orbit condition of the spacecraft, and the machine body rotational control condition.

Seventh Embodiment

The seventh embodiment describes various functions implemented by the use of the thin film.

In this case, the thin film is laid over a plane defined by three or more tension members 2 connected via the respective end portions 7 of the deployable beam members 1. The first function of the thin film is implemented by a photon-energy receiver for receiving photons. This makes it possible to operate the spacecraft using photon energy over a long period.

FIG. 20 illustrates the photon energy absorption part having the thin film laid over planes defined by the deployable beam members 1 and the tension members 2 so that the thin film serves to absorb photons from the fixed star.

In this embodiment, the photon energy absorption parts are formed by laying the thin film over eight apertures in the planes each defined by the tension members 2. The absorption part absorbs incoming photons from the fixed star, and utilizes the energy for power generation, for example.

The spacecraft 3 is supposed to be operated under various rotational control operations. The tension members 2 on which the photon-energy receiver can be mounted are disposed symmetrically in an omnidirection of the spacecraft 3. The photon energy absorption parts are directed to the fixed star at an arbitrary rotation angle. Constant power generation is attained irrespective of a posture of the spacecraft 3. This makes it possible to operate the spacecraft 3 over a long period.

The thin film is laid over the plane defined by three or more tension members 2 connected via the respective end portions 7 of the deployable beam members 1. The second function of the thin film is implemented by a photon-energy reflector for reflecting photons. This makes it possible to operate the spacecraft through reflection of the photon energy over a long period.

FIG. 21 illustrates the photon-energy reflector having the thin film laid over planes defined by the deployable beam members 1 and the tension members 2 so that the thin film serves to reflect photons from the fixed star.

In this embodiment, the photon-energy reflectors are formed by laying the thin film over eight apertures in the planes each defined by the tension members.

As the photon-energy reflector reflects incoming photons from the fixed star, the resultant counterforce can be used by the spacecraft 3 for the driving force, for example. The spacecraft is supposed to be operated under various rotational control operations. The photon-energy reflectors are directed to the fixed star at any rotation angle, and accordingly, the translational thrust can be constantly generated irrespective of the posture of the spacecraft. This makes it possible to provide the spacecraft which can be operated over a long period under the driving force without using the propellant.

Referring to FIG. 22, the photon-energy reflector can be configured to make the reflectance variable using a liquid crystal or an electrochromic device, for example. This makes it possible to execute the torque control. As FIG. 22 illustrates, the photon-energy reflector allows adjustment of reflection and transmission of photons by making the transmittance of the photon variable using the liquid crystal.

As illustrated in FIG. 22, the photon energy is reflected at the upper part of the spacecraft 3, and the photon energy is transmitted at the lower part of the spacecraft 3. As a result, the torque generated by the spacecraft 3 makes its posture controllable. According to the present invention, the tension members 2 which allow the photon-energy reflectors to be mountable are symmetrically disposed in an omnidirection of the spacecraft. This attains posture control operations in all directions.

REFERENCE SIGNS LIST

10: stereostructure spacecraft, 1: deployable beam members, 2: tension members, 3: spacecraft, 5: rotational symmetry axis, 7: end portion, 0: origin

What is claimed is:

1. A stereostructure spacecraft comprising:
multiple deployable beam members;
multiple tension members; and
a spacecraft for storing the deployable beam members and the tension members,
wherein the stereostructure spacecraft is formed by deploying the deployable beam members and the tension members around the spacecraft,
wherein the deployable beam members stored in the spacecraft are deployed and arranged equidistantly in directions of multiple rotational symmetry axes, the rotational symmetry axes being rotational symmetry axes of a virtual polyhedron that is formed to have a substantial center of the spacecraft as an origin,
wherein the tension members support two end portions of two adjacent deployable beam members with tension, and
wherein the respective end portions of the deployable beam members are simultaneously supported by three or more of the tension members.

2. The stereostructure spacecraft according to claim 1,
wherein the rotational symmetry axes are three orthogonal axes orthogonal to one another,
wherein the deployable beam members include first deployable beam member and second deployable beam member, and
wherein the first deployable beam member and the second deployable beam member are arranged equidistantly in positive-negative direction of the rotational symmetry axes, the rotational symmetry axes being formed to have an origin that is a substantial center of the spacecraft.

3. The stereostructure spacecraft according to claim 1,
wherein the rotational symmetry axes are three orthogonal axes orthogonal to one another,
wherein the deployable beam members include first deployable beam member and second deployable beam member, and
wherein the first deployable beam member and the second deployable beam member are arranged equidistantly in positive-negative direction to have each longitudinal direction orthogonal to the rotational symmetry axes, the rotational symmetry axes being formed to have an origin that is a substantial center of the spacecraft.

4. The stereostructure spacecraft according to claim 1, further comprising:

a thin film included in a plane, the plane being formed by three or more of the tension members connecting the respective end portions of the deployable beam members, wherein the deployable beam members, the tension members, and the thin film include one or more antenna structures for radiating or receiving electromagnetic waves.

5. The stereostructure spacecraft according to claim 4, wherein the spacecraft receives and analyzes electromagnetic waves including rotation information by receiving the electromagnetic waves with rotating along the multiple rotational symmetry axes, and the spacecraft identifies characteristics of the electromagnetic waves and positions of sources of the electromagnetic waves.

6. The stereostructure spacecraft according to claim 5, wherein the spacecraft downlinks an analysis result to a ground station, and the ground station examines an analysis pattern change according to an orbit condition of the spacecraft and the rotation information.

7. The stereostructure spacecraft according to claim 1, further comprising:

a thin film included in a plane, the plane being formed by three or more of the tension members connecting the respective end portions of the deployable beam members, wherein the deployable beam members, the tension members, and the thin film include a photon-energy receiver for receiving photons.

8. The stereostructure spacecraft according to claim 1, further comprising:

a thin film included in a plane, the plane being formed by three or more of the tension members connecting the respective end portions of the deployable beam members, wherein the deployable beam members, the tension members, and the thin film include a photon-energy reflector for reflecting photons.

\* \* \* \* \*